US010836426B1

(12) United States Patent
Busboom et al.

(10) Patent No.: US 10,836,426 B1
(45) Date of Patent: Nov. 17, 2020

(54) ACTIVE STEERING SYSTEM AND GROUNDS MAINTENANCE VEHICLE INCLUDING SAME

(71) Applicant: EXMARK MANUFACTURING COMPANY, INCORPORATED, Beatrice, NE (US)

(72) Inventors: Garry W. Busboom, Beatrice, NE (US); Christian S. C. Bryant, Lincoln, NE (US); Sang Pheng, Lincoln, NE (US); James R. Gaebel, Eden Prairie, MN (US)

(73) Assignee: Exmark Manufacturing Company, Incorporated, Beatrice, NE (US)

( * ) Notice: Subject to any disclaimer, the term of this patent is extended or adjusted under 35 U.S.C. 154(b) by 323 days.

(21) Appl. No.: 15/089,886

(22) Filed: Apr. 4, 2016

Related U.S. Application Data

(60) Provisional application No. 62/143,347, filed on Apr. 6, 2015.

(51) Int. Cl.
| *B62D 9/00* | (2006.01) |
| *B62D 11/02* | (2006.01) |
| *B62D 11/06* | (2006.01) |
| *B60W 10/20* | (2006.01) |
| *B60W 30/18* | (2012.01) |
| *B62D 11/00* | (2006.01) |

(52) U.S. Cl.
CPC ..... *B62D 11/003* (2013.01); *B60W 30/18145* (2013.01); *B62D 11/06* (2013.01); *B60W 2300/156* (2013.01); *B60Y 2200/223* (2013.01)

(58) Field of Classification Search
CPC ...... B62D 11/003; B62D 11/06; B62D 9/002; B62D 5/0418; B60W 30/18181; B60W 30/18145; B60W 2300/156; B60W 10/20; B60Y 2200/223
USPC ........ 180/6.23, 6.24, 6.28, 6.3, 6.62; 701/41
See application file for complete search history.

(56) References Cited

U.S. PATENT DOCUMENTS

| 2,191,961 A | 2/1940 | Howell |
| 2,659,445 A | 11/1953 | Church |
| 2,899,793 A | 8/1959 | Swisher |

(Continued)

FOREIGN PATENT DOCUMENTS

| EP | 0806337 A1 | 12/1997 |
| GB | 2173746 A | 10/1986 |
| WO | WO 2009/059396 A1 | 5/2009 |

OTHER PUBLICATIONS

U.S. Appl. No. 62/143,347, filed Apr. 6, 2015, Busboom et al.

(Continued)

*Primary Examiner* — Anne Marie M Boehler
(74) *Attorney, Agent, or Firm* — Mueting Raasch Group

(57) ABSTRACT

A small radius- or zero radius-turn vehicle that may be steered by differentially-driven rear drive wheels and by at least one electronically-controlled, steerable front wheel. A device, e.g., one or more levers, may be provided that controls both speed and direction of the drive wheels. A sensor may be provided that detects a position of the lever(s). A controller may calculate a steering angle of the front wheel based upon the position, and issue a command to an actuator associated with the front wheel. The actuator may rotate the front wheel to an electronically calculated steering angle in response to the command.

20 Claims, 12 Drawing Sheets

(56) References Cited

U.S. PATENT DOCUMENTS

| | | |
|---|---|---|
| 3,362,493 A | 1/1968 | Davis et al. |
| 3,575,254 A | 4/1971 | Sipos |
| 3,612,199 A | 10/1971 | Vissers |
| 3,792,748 A | 2/1974 | Regier |
| 3,876,012 A | 4/1975 | Regier |
| 5,042,238 A | 8/1991 | White, III et al. |
| RE34,057 E | 9/1992 | Middlesworth |
| 5,263,901 A | 11/1993 | Kawakami et al. |
| 5,288,091 A | 2/1994 | Deschamps |
| 5,383,528 A | 1/1995 | Nicol |
| 5,794,422 A | 8/1998 | Reimers et al. |
| 5,850,886 A | 12/1998 | Kouno et al. |
| D409,208 S | 5/1999 | Eavenson et al. |
| 5,913,802 A | 6/1999 | Mullet et al. |
| 5,946,894 A | 9/1999 | Eavenson et al. |
| 6,082,084 A | 7/2000 | Reimers et al. |
| 6,092,617 A | 7/2000 | White, III et al. |
| 6,122,579 A * | 9/2000 | Collier-Hallman ......... B62D 5/0472 180/234 |
| 6,129,164 A | 10/2000 | Teal et al. |
| 6,185,920 B1 | 2/2001 | Oxley |
| 6,196,342 B1 | 3/2001 | Teal et al. |
| 6,257,357 B1 | 7/2001 | Teal et al. |
| 6,301,864 B1 | 10/2001 | Damie et al. |
| 6,336,513 B1 | 1/2002 | Hasegawa et al. |
| 6,354,388 B1 | 3/2002 | Teal et al. |
| 6,449,934 B1 | 9/2002 | Reimers et al. |
| 6,456,925 B1 | 9/2002 | Romig |
| 6,460,640 B1 | 10/2002 | Keagle et al. |
| 6,481,524 B1 | 11/2002 | Ishida et al. |
| 6,484,827 B2 | 11/2002 | Teal et al. |
| 6,554,085 B2 | 4/2003 | Hasegawa et al. |
| 6,601,663 B2 | 8/2003 | Hauser |
| 6,644,004 B2 | 11/2003 | Reimers et al. |
| 6,662,538 B2 | 12/2003 | Eavenson, Sr. et al. |
| 6,672,411 B1 | 1/2004 | Mouser |
| 6,699,147 B1 | 3/2004 | Speece et al. |
| 6,725,954 B1 | 4/2004 | Keane et al. |
| 6,808,032 B2 | 10/2004 | Wuertz et al. |
| 6,840,345 B2 | 1/2005 | Ferrari |
| 6,857,253 B2 | 2/2005 | Reimers et al. |
| 6,874,305 B2 | 4/2005 | Ishimori |
| 6,904,985 B2 | 6/2005 | Ferree et al. |
| 6,951,259 B2 | 10/2005 | Irikura |
| 6,962,219 B2 | 11/2005 | Hauser |
| 6,988,570 B2 * | 1/2006 | Takeuchi ............ B60L 15/2036 180/6.48 |
| 7,004,268 B2 | 2/2006 | Irikura |
| 7,017,327 B2 | 3/2006 | Hunt et al. |
| 7,044,244 B2 | 5/2006 | Irikura |
| 7,047,712 B1 | 5/2006 | Hunt et al. |
| 7,108,096 B1 | 9/2006 | Oxley et al. |
| 7,159,695 B2 * | 1/2007 | Strong ................ B60B 33/0002 16/35 D |
| 7,237,629 B1 | 7/2007 | Bland et al. |
| 7,302,789 B2 | 12/2007 | Eavenson, Sr. et al. |
| 7,313,902 B1 | 1/2008 | Eavenson, Sr. et al. |
| 7,331,412 B2 | 2/2008 | Irikura |
| 7,455,130 B2 | 11/2008 | Irikura |
| 7,458,431 B2 | 12/2008 | Irikura |
| 7,493,975 B2 | 2/2009 | Irikura |
| 7,686,107 B1 | 3/2010 | Bland et al. |
| 7,708,091 B2 | 5/2010 | Osborne |
| 7,721,517 B2 | 5/2010 | Hunt et al. |
| 7,857,079 B2 | 12/2010 | Irikura |
| 7,914,022 B2 | 3/2011 | Ruebusch et al. |
| 7,992,659 B2 | 8/2011 | Schaedler et al. |
| 8,011,458 B2 | 9/2011 | Hauser |
| 8,056,653 B2 | 11/2011 | Hunt et al. |
| 8,136,613 B2 | 3/2012 | Schaedler et al. |
| 8,157,030 B2 | 4/2012 | Greenwood et al. |
| 8,240,420 B1 | 8/2012 | Bartel et al. |
| 8,474,841 B2 | 7/2013 | Ruebusch et al. |
| 8,544,570 B2 * | 10/2013 | Ishii ....................... A01D 34/64 180/6.5 |
| 8,579,065 B2 * | 11/2013 | Bergsten ............... A01D 69/03 180/234 |
| 8,657,041 B2 | 2/2014 | Ishii et al. |
| 8,695,734 B2 | 4/2014 | Greenwood et al. |
| 8,838,311 B2 | 9/2014 | Koike et al. |
| 8,855,861 B2 | 10/2014 | Goebel et al. |
| 8,887,841 B2 | 11/2014 | Oswald et al. |
| 8,919,464 B2 | 12/2014 | Greenwood et al. |
| 9,725,115 B1 * | 8/2017 | Hauser ................... B62D 11/04 |
| 2003/0019682 A1 | 1/2003 | Schaedler et al. |
| 2005/0188665 A1 | 9/2005 | Reimers et al. |
| 2006/0175098 A1 | 8/2006 | Sutherland |
| 2007/0068711 A1 * | 3/2007 | Adkins .................. A01D 69/03 180/6.48 |
| 2007/0204581 A1 | 9/2007 | Reimers et al. |
| 2008/0277188 A1 | 11/2008 | Hauser et al. |
| 2009/0000839 A1 | 1/2009 | Ishii et al. |
| 2009/0188728 A1 | 7/2009 | Osborne |
| 2009/0241708 A1 | 10/2009 | Schaedler et al. |
| 2009/0250270 A1 | 10/2009 | Hauser |
| 2010/0206647 A1 * | 8/2010 | Ishii ....................... B60K 17/30 180/6.24 |
| 2011/0248462 A1 | 10/2011 | Schaedler et al. |
| 2012/0041658 A1 * | 2/2012 | Turner ............... B62D 15/0215 701/68 |
| 2012/0260759 A1 | 10/2012 | Schaedler et al. |
| 2014/0013874 A1 | 1/2014 | Ruebusch et al. |
| 2014/0371991 A1 | 12/2014 | Buchanan |
| 2015/0039171 A1 | 2/2015 | Koike et al. |
| 2015/0151781 A1 | 6/2015 | Hauser et al. |
| 2015/0223386 A1 * | 8/2015 | Nafziger ............... A01B 69/007 180/6.24 |

OTHER PUBLICATIONS

"Angle Position Sensors, AN8 Sensors," Product Datasheet, Cherry Switches, Oct. 29, 2014; 2 pages.

Bird, "Conventionally-Steered Zero turn mowers from Massey Ferguson" [online]. Pitchcare.com Industry News, Apr. 6, 2009. [Retrieved on May 31, 2017]. Retrieved from the internet: <URL:https://www.pitchcare.com/news-media/conventionally-steered-zero-turn-mowers-from-massey-ferguson.html; 3 pages.

"Eclipse® 322 Riding Greens Mower with ROPS," Parts Manual, 4187721-Rev E, Jacobsen, A Textron Company/Textron Innovations Inc., 2010; 134 pages.

"GT Range," Product Datasheet, Gianni Ferrari, May 2012, 8 pages.

"Hall-Effect Quadrature Sensor (HQ)." Product Datasheet [online]. Sensoronix, Inc. [retrieved Oct. 30, 2014]. Retrieved from the Internet: <URL:http://sensoronix.com/00pdf/HQXXX-X00.pdf>; 2 pages.

"Inductive Sensor With Analog Output BI15-M30E-LIU-H1141." Product Datasheet, Hans Turck GmbH & Co.KG, May 17, 2013; 3 pages.

"PST-360 Through Shaft Contactless Sensor." Product Datasheet [online]. Piher Sensors & Controls S.A. Believed available at least as early as Feb. 26, 2015. [Retrieved May 31, 2017]. Retrieved from the Internet: <https://web.archive.org/web/20150226032645/http://piher.net:80/pdf/PST-360.pdf>; 5 pages.

* cited by examiner

ACTIVE STEERING SYSTEM AND GROUNDS MAINTENANCE VEHICLE INCLUDING SAME

This application claims the benefit of U.S. Provisional Application No. 62/143,347, filed Apr. 6, 2015, which is incorporated herein by reference in its entirety.

Embodiments of the present disclosure are directed to grounds maintenance vehicles such as lawn mowers and, more particularly, to vehicles having differentially driven rear drive wheels and actively steered front wheels.

BACKGROUND

Grounds maintenance vehicles such as skid-steer loaders, material spreaders/sprayers, lawn mowers, and the like are known. Depending on the particular configuration, these vehicles may have a drive control system with independently controlled drive members (e.g., rear wheels) on opposite sides of the vehicle that are configured to propel the vehicle over a ground surface. By differentially controlling rotation of the two drive wheels, the vehicle may be turned.

One such vehicle that is driven in this fashion is a Zero-Turn-Radius (ZTR) lawn mower. Such mowers generally include a pair of independently driven rear wheels. A pair of passively steered (castering) front wheels may also be provided to support the front of the mower in rolling engagement with the ground surface. The directional angle of the front wheels may change under the influence of one or both of the driving wheels and the ground terrain. Such vehicles are able to execute small-, or even zero-, radius turns.

It is further known to actively steer the front wheels of a ZTR mower by mechanically coupling the front wheels to the mower drive control system. As a result, in addition to differentially driving the rear wheels, the front wheels of the mower may be simultaneously positioned at a steering angle that assists the mower in executing the turn and/or maintaining the desired vehicle heading. Such a steering configuration may provide improved performance under certain operating conditions (e.g., during hillside operation).

SUMMARY

Embodiments of the present disclosure may provide a grounds maintenance vehicle that includes: a frame having a front end and a rear end; a prime mover attached to the frame; and first and second drive members connected to opposite sides of the frame at or near the rear end, wherein the drive members are adapted to propel the vehicle over a ground surface. A drive system is also included and operatively connects each drive member to the prime mover, wherein the drive system is adapted to independently transmit power from the prime mover to each of the first and second drive members. An input device is provided and operatively connected to the drive system to control both a speed and a direction of the first and second drive members. Also included are: a position sensor adapted to sense a position of the input device and output a position signal based thereon; and a steerable wheel connected to the frame at or near the front end, the steerable wheel supporting a portion of the vehicle upon the ground surface. A controller is also provided and adapted to receive the position signal and output a steering angle command based thereon. An actuator in communication with the controller is connected to the steerable wheel, wherein the actuator is adapted to reposition the steerable wheel to a steering angle corresponding to the steering angle command.

In another embodiment, a grounds maintenance vehicle is provided that includes: a frame having a front end and a rear end; a prime mover attached to the frame; and first and second drive members connected to opposite sides of the frame at or near the rear end, wherein the drive members are adapted to propel the vehicle over a ground surface. A drive system is also provided and operatively connects each drive member to the prime mover, wherein the drive system is adapted to independently transmit power from the prime mover to each of the first and second drive members. First and second control levers movable relative to the frame are also provided, the first and second control levers operatively connected to the drive system and adapted to independently control both a speed and a direction of the first and second drive members, respectively. First and second lever position sensors are adapted to sense a position of the first and second control levers, respectively, and output first and second lever position signals, respectively. A steerable wheel is connected to the frame at or near the front end, wherein the steerable wheel supports a portion of the vehicle upon the ground surface. A controller is adapted to receive the first and second lever position signals and output a steering angle command based thereon. An actuator in communication with the controller is connected to the steerable wheel, wherein the actuator is adapted to reposition the steerable wheel to a steering angle corresponding to the steering angle command.

In another embodiment, a riding lawn mower vehicle is provided that includes: a frame; a prime mover attached to the frame; and first and second drive wheels attached to opposite sides of a rear portion of the frame, the drive wheels adapted to propel the vehicle over a ground surface, wherein first and second transmissions are configured to power the first and second drive wheels, respectively. A first control lever is mechanically coupled to the first transmission such that movement of the first control lever through a range of motion causes the first transmission to alter a speed and a direction of the first drive wheel; while a second control lever is mechanically coupled to the second transmission such that movement of the second control lever through a range of motion causes the second transmission to alter a speed and a direction of the second drive wheel. First and second lever position sensors are associated with the first and second control levers, respectively, wherein each of the lever position sensors is adapted to detect a position of its associated control lever, within its range of motion, and generate a lever position signal representative thereof. First and second steerable wheels support a front portion of the vehicle upon the ground surface, and a cutting deck is provided and connected to the frame. A controller is adapted to receive the lever position signals from each of the first and second lever position sensors and generate first and second steering angle commands based thereon. First and second actuators are connected to the first and second steerable wheels, respectively, wherein the first and second actuators are adapted to receive the first and second steering angle commands, respectively, and set a steering angle for the corresponding first and second steerable wheels.

In yet another embodiment, a method for actively controlling a steering angle of a front wheel of a grounds maintenance vehicle is provided, wherein the method includes: detecting, with a controller, a first steering condition defined by a first position of an input device associated with the vehicle, wherein the input device independently governs speed and direction of differentially driven first and second rear drive members connected to the vehicle; and calculating a first turn center of the vehicle based upon the first position of the input device. The method further includes: detecting a second steering condition resulting from movement of the input device from the first position to a second position, wherein the second position indicates a second turn center different than the first turn center; and maintaining the first turn center for a period of time while the input device is in the second position.

In still another embodiment, a method for actively controlling a steering angle of a front wheel of a grounds maintenance vehicle is provided, wherein the method includes: detecting, with a controller, a first position of an input device associated with the vehicle, wherein the input device independently controls speed and direction of differentially driven first and second rear drive wheels of the vehicle; calculating a first steering angle command for a front wheel of the vehicle based upon the first position of the input device; and turning the front wheel to a first steering angle corresponding to the first steering angle command. The method further includes: detecting, with the controller, movement of the input device to a second position; calculating a second steering angle command based upon both the first position and the second position of the input device; turning the front wheel to a second steering angle in response to the second steering angle command; and dampening, with the controller, movement of the front wheel from the first steering angle to the second steering angle.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein:

FIGS. 12A-12B are graphs of steering angle vs. time (in steps), wherein: FIG. 12A shows the graph before dampening; and FIG. 12B shows the graph after applying a dampening algorithm in accordance with embodiments of the present disclosure.

Figure 1:
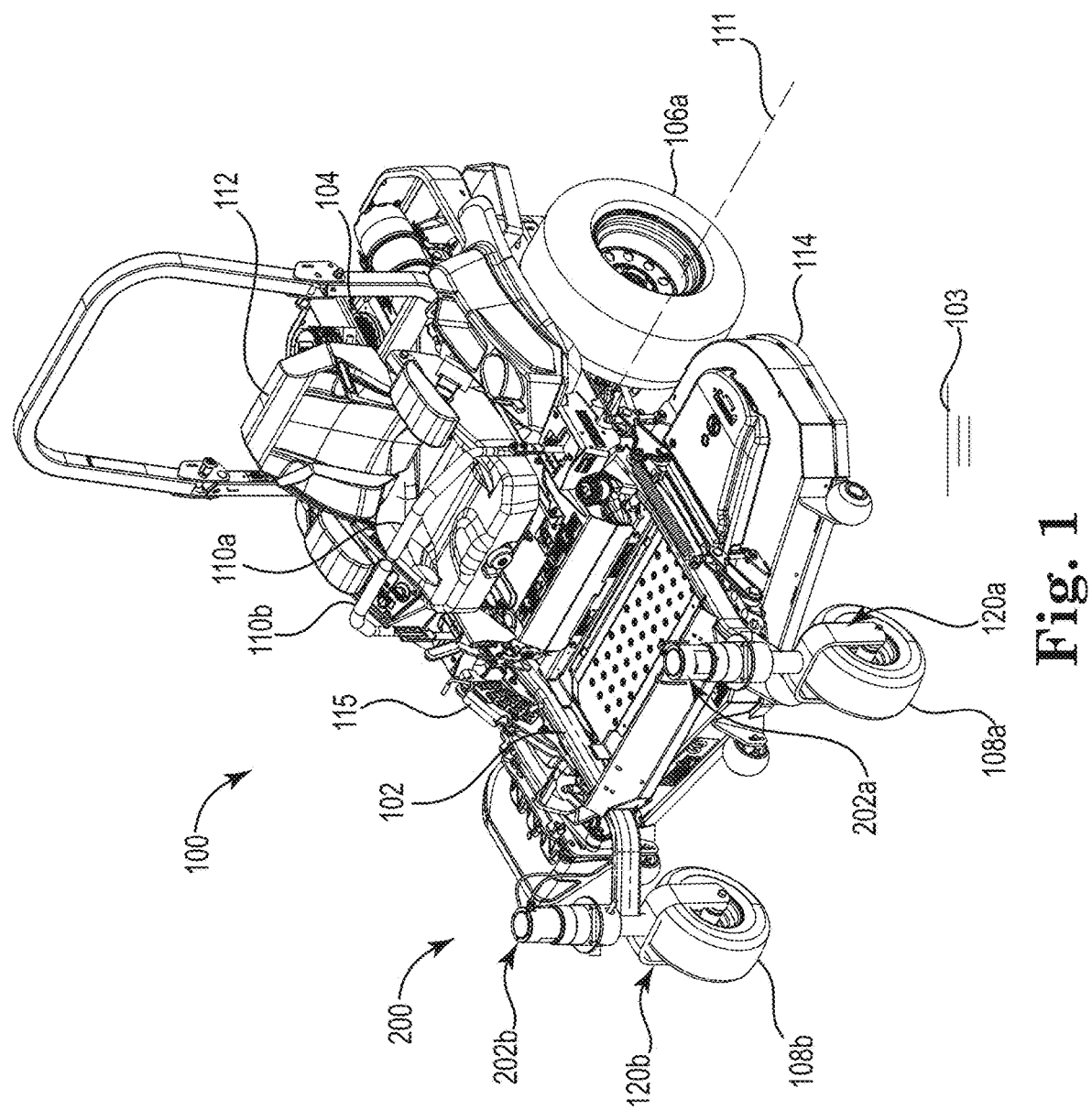
FIG. 1 is a front perspective view of a differentially driven grounds maintenance vehicle, e.g., a ZTR turf vehicle, the vehicle having a steering system in accordance with one embodiment of the present disclosure.

The figures are rendered primarily for clarity and, as a result, are not necessarily drawn to scale. Moreover, various structure/components, including but not limited to fasteners, electrical components (e.g., wiring, cables, etc.), hydraulic components (e.g., hoses) and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may or may not be described and/or illustrated, are certainly contemplated.

All headings provided are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, perpendicular, parallel, etc.), in the specification and claims are understood as being modified by the term "about."

FIG. 1 illustrates an exemplary grounds maintenance vehicle 100 incorporating a steering system 200 in accordance with embodiments of the present disclosure. While the vehicle is shown in this view as a self-propelled ZTR riding lawn mower (also referred to herein simply as a "mower" or "vehicle"), such a configuration is not limiting. That is, while embodiments are described herein with respect to a riding mower, those of skill in the art will realize that other embodiments of this disclosure will find applicability to other types of riding or walk-behind, differentially-driven grounds maintenance vehicles/equipment including skid-steer vehicles, aerators, material spreader/sprayers, dethatchers, snow throwers, and debris management systems, to name a few.

Figure 6:
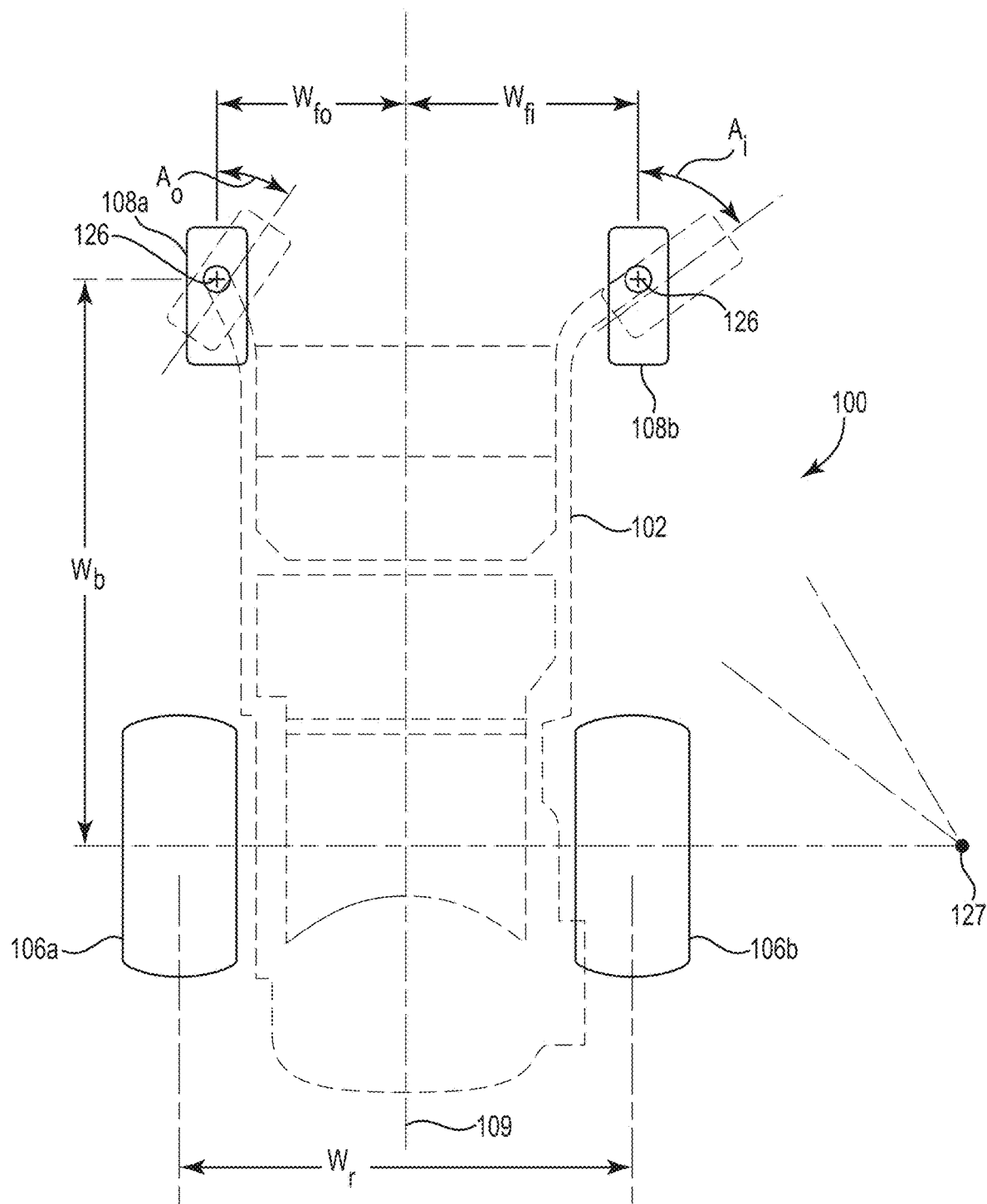
FIG. 6 is a diagrammatic representation of a vehicle illustrating various exemplary steering system parameters.

The exemplary mower 100 may include two differentially-driven and independently controlled rear drive members (e.g., described and illustrated herein as wheels 106a, 106b; see also FIG. 6) and at least one (e.g., two) steerable support members (e.g., first (e.g., left) and second (e.g., right) front wheels 108a, 108b) that are located forward of the rear drive wheels during normal (e.g., forward) mower operation. The mower may further include a twin lever drive control system having first (e.g., left) and second (e.g., right) drive control levers (e.g., levers 110a, 110b; further described below) adapted to independently control speed and direction of the first (e.g., left) and second (e.g., right)

drive wheels, respectively. In order to steer the front wheels 108, embodiments of the steering system 200 may include an electronic steer controller adapted to receive information regarding at least a position of each control lever and issue steering angle commands to one or more actuators that actively reposition (turn) each of the front wheels to an appropriate calculated steering angle corresponding with an intended direction of travel of the vehicle.

While described herein as utilizing two rear drive wheels and two steerable front wheels, such a configuration is only exemplary. Other embodiments may achieve the desired steering configuration with less wheels (e.g., a tri-wheel configuration having two drive wheels and a single steerable wheel). Still other embodiments may provide more than two drive wheels, and/or also drive the steerable wheels. Still further, embodiments like those described herein could be modified to accommodate vehicles having both steerable front and steerable rear wheels. Accordingly, the embodiments described herein are intended to be exemplary only.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," "perpendicular" and the like may be used herein and, if so, are from the perspective of one operating the mower 100 while the mower is in an operating orientation, e.g., while the mower 100 is positioned such that wheels 106 and 108 rest upon a generally horizontal ground surface 103 as shown in FIG. 1. These terms are used only to simplify the description, however, and not to limit the interpretation of any embodiment described.

The suffixes "a" and "b" may be used throughout this description to denote various left- and right-side parts/features, respectively. However, in most pertinent respects, the parts/features noted with "a" and "b" suffixes may be substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

An exemplary mower configuration, although not necessarily central to an understanding of embodiments of the steering system, is now briefly described with initial reference to FIG. 1. As shown in this view, the mower 100 may include a chassis or frame 102 having front and rear ends and supporting a prime mover, e.g., internal combustion engine 104. First (left) and second (right) ground engaging drive members (e.g., wheels 106) may be rotatably coupled to opposite (left and right) sides of the frame 102 at or near the rear end of the mower 100. The drive wheels 106 may be independently driven by the engine (e.g., via a drive system operatively and independently connecting each wheel 106 to the engine 104, the drive system including one or more hydraulic motors/pumps, hydrostatic transmissions, or the equivalent) so that the drive wheels 106 may selectively propel the mower 100 over the ground surface 103 during operation. Other embodiments could utilize other prime movers, e.g., an electrical power source powering electric motor(s) that drive the drive wheels 106.

As used herein, the term "wheel" is understood to include at least a vehicle mounting portion (e.g., rim) and a ground contacting portion (e.g., tire). The tire may be of most any configuration (e.g., pneumatic, non-pneumatic, solid) and be made of most any material (e.g., rubber, plastic, metal, etc.). While described and illustrated as wheels, most any drive member configuration, e.g., tracks or the like, may also be utilized.

The mower 100 may further include an input device or control that, in one embodiment, is configured as the left and right drive control levers 110*a*, 110*b*. The drive control levers 110 may be pivotally coupled to the frame of the mower such that they may independently pivot forwardly and rearwardly (e.g., about a transverse axis 111) under the control of an operator located at an operator's station that, in one embodiment, is a seat 112. The drive control levers 110 are operable to control the speed and direction of their respective drive wheels 106 (e.g., lever 110*a* controls wheel 106*a*, while lever 110*b* controls wheel 106*b*) via manipulation of the mower's drive system as is further described below. While illustrated herein as incorporating separate drive control levers 110, other input devices, e.g., single or multiple joysticks or joystick-type levers, touchpads, etc. could also be used.

One or more support wheels (e.g., left and right front steerable wheels 108*a*, 108*b*) may be connected to the frame 102 at or near the frame's front end and support a front portion of the mower 100 upon (e.g., in rolling engagement with) the ground surface 103. As further described below, the wheels 108 may be actively steered under the control of the steering system 200, embodiments of which are further described below.

An implement, e.g., a lawn mower cutting deck 114, may be connected to the lower side of the frame 102, e.g., generally between the rear drive wheels 106 and the front wheels 108 in what is referred to as a mid- or belly-mount configuration. The cutting deck 114 may include a deck housing forming a cutting chamber. The cutting chamber may partially surround one or more rotatable cutting blades (not shown) as is known in the art. While shown as a mid- or belly-mount deck, other embodiments may position the deck in other locations, e.g., forward of the front wheels 108, aft of the rear wheels 106, lateral to the frame 102, etc.

During operation, power is selectively delivered (by the prime mover 104) to the cutting deck 114 and the drive wheels 106, whereby the cutting blades rotate at a speed sufficient to sever grass and other vegetation as the deck passes over the ground surface 103. Typically, the cutting deck 114 has an operator-selectable height-of-cut system 115 to allow deck height adjustment relative to the ground surface 103.

With conventional mid-mount ZTR mowers, the front wheels passively caster to a steering angle dictated by the drive wheels and the ground terrain. That is, they merely react to forces imparted to the mower by the drive wheels and the terrain. Moreover, with conventional ZTR mowers, maintaining adequate traction during steering (e.g., avoiding excessive wheel slip) may minimize turf damage. Yet, weight transfer from one or both of the drive wheels may reduce the desired mower traction. Such weight transfer from the rear wheels to the passively-steered front wheels may occur during deceleration of the mower, e.g., such as may occur as the mower slows for a turn. As such deceleration occurs, the ability of the rear wheels to steer the mower (via differential rotation) in the intended direction may be somewhat reduced as compared to forward acceleration (or steady state, forward propulsion). Still further, centrifugal forces during a turn may shift weight from the inside wheels to the outside wheels, further reducing the inside rear wheel's ability to effect the desired turn. Undesirably, as this weight shift occurs, passively-steered front wheels are unable to assist with directional control of the decelerating mower as they again merely track in accordance with the forces imparted by the rear wheels and/or those forces imparted by the ground itself.

Moreover, with vehicles having passively-steered front wheels, hillside directional control (while traversing side-to-side across the slope) may be reduced due to the weight transfer from the "uphill" (more elevated) drive wheel to the "downhill" (less elevated) drive wheel. This reduced traction or slip of the uphill drive wheel may require increased steering input to (i.e., higher torque output of) the downhill drive wheel in order to maintain the desired directional heading across the slope. This additional torque and weight on the downhill wheel, and the slip of the uphill wheel, may both contribute to turf damage.

In order to address these problems, embodiments of the present disclosure provide active steering control of the front wheels. By providing directional control using active front wheel steering in addition to independent rear wheel differential steering, negative effects of weight transfer between wheels may be reduced. That is to say, actively steering the front wheels may negate some of the effects of weight transfer between front and rear wheels and/or between the two (e.g., uphill and downhill) drive wheels. As a result, improved directional control may be provided during transverse hillside operation as well as during mower acceleration/deceleration.

As one of skill may appreciate, during a typical forward turn, the mower 100 may decelerate prior to and/or during the turn. As this deceleration advantageously shifts weight to the steerable front wheels, the benefit of actively steered front wheels is evident. It is worth noting, however, that this benefit is generally absent from ZTRs having driven front wheels and actively-steered rear wheels as the weight transfer that occurs during forward deceleration may actually reduce the weight borne by the steerable (rear) wheels in such a configuration.

Mowers in accordance with embodiments of the present disclosure may uniquely incorporate a steering system 200 capable of actively positioning each front wheel 108 at a calculated steering angle that corresponds to an intended driving direction (each front wheel 108 may be simultaneously commanded to a different calculated steering angle). Stated another way, in addition to steering the mower 100 via differentially rotating the drive wheels 106, the steering system 200 may also steer the mower 100 by actively positioning the front wheels at electronically calculated steering angles.

Figure 2:
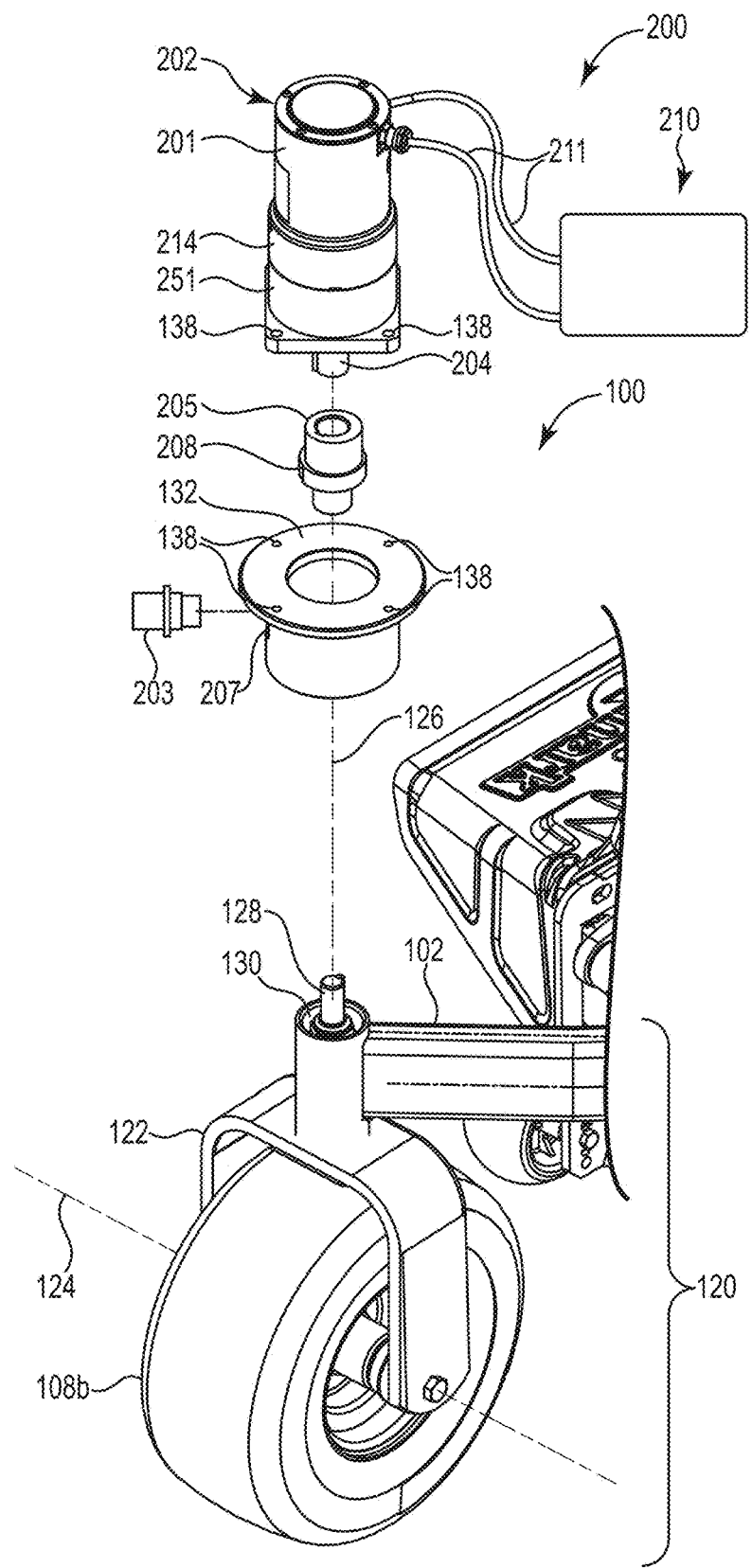
FIG. 2 is an exploded view of an exemplary steerable front wheel assembly of the vehicle of FIG. 1 illustrating a portion of the steering system.

FIG. 2 illustrates an exemplary front wheel assembly 120 of the mower 100 and a corresponding portion of the steering system 200. As indicated in FIG. 2, the front wheel assembly 120 (e.g., right front wheel assembly 120b) may include the wheel 108 (e.g., wheel 108b) and a U-shaped clevis 122 to which the wheel is journalled for rotation about an axis 124. The clevis 122 may include a vertical spindle 128 that is itself journalled for rotation, relative to the frame 102, about a vertical spindle axis 126. In one embodiment, a pair of tapered roller bearings (not shown) may be used to mount the spindle 128 within a passage 130 of the frame as shown. Unlike conventional passive ZTR cantering wheels, it is not necessary for the axis 124 of the wheel 108 to trail behind the spindle axis 126 in the direction of mower travel. Rather, at least in some embodiments, the axes 124 and 126 may be in-line with, e.g., intersect, one another.

The term "journalled," as used herein, indicates that a first component (e.g., the spindle 128 of the clevis 122) is coupled to a second component (e.g., the passage 130 of the frame) such that the first component may rotate therein about an axis (e.g., the vertical spindle axis 126) via the use of bearings, bushings, or other friction-reducing devices.

To permit active rotation of the wheel assembly 120 about the axis 126, the vertical spindle 128 may extend upwardly into or even through the passage 130 when the wheel assembly 120 is installed as shown in FIG. 2. In one embodiment, an adapter 132 may be installed over the passage 130 and secured to the frame 102 in any acceptable manner (e.g., welded). The adapter may, as described below, permit the wheel assembly 120 to mechanically interconnect with other parts of the steering system 200.

With continued reference to FIG. 2, the steering system 200 may include an actuator that attaches to the adapter 132. As used herein, "actuator" refers to a hydraulic, electric, or pneumatic rotary or linear motor that converts, respectively, hydraulic, electric, or pneumatic energy to rotary motion (for convenience, the terms "actuator" and "steering motor" may be used interchangeably herein). In one embodiment, attachment may be via bolts (not shown) passing through aligned bolt holes 138 in the steering motor 202 and the adapter 132. In other embodiments, the frame 102 may permit direct attachment with the steering motor 202, potentially negating the need for the adapter 132.

In some embodiments, the steering motor 202 is an electric motor that may include not only a motor unit 201 (see FIG. 2), but a speed reduction unit 251 as well, the latter providing an appropriate reduction in output speed (and increase in output torque) for an output shaft 204 of the steering motor. For example, in one embodiment, the exemplary motor (motor unit 201 and speed reduction unit 251) may be a model PSM-B-300X-B-X5 available from Kollmorgen of Radford, Va., USA. The speed reduction unit 251 of this particular steering motor may provide a 35:1 reduction in speed at the output shaft 204. Of course, other motors, and other speed reduction ratios, may be selected depending on the requirements of the particular steering system 200.

The rotatable output shaft 204 may couple to the spindle 128 of the wheel assembly 120 in any acceptable manner. In the illustrated embodiment, a coupler 205 having splined or key/keyway interfaces on each side (only top side visible) may be used to connect the output shaft 204 with the spindle 128. However, most any coupler configuration that allows rotationally fixing the spindle 128 to the output shaft 204 could be used. Regardless of the coupler used, the output shaft 204 of the steering motor 202 may rotate and hold the spindle 128 (and thus the entire wheel assembly 120) at a desired steering angle as further described below.

The term "steering angle" is used herein to identify an angle between a heading of the steered wheel 108 (the angular position of the wheel when viewed along the vertical spindle axis 126) relative to a longitudinal axis 109 (see FIG. 6) of the mower 100. For example, when the mower is travelling straight ahead, the steering angle of both front wheels is zero degrees. As with other Ackermann-type steering configurations, each of the front wheels 108a, 108b may have a different steering angle during a turn as the steering angle of each wheel is dictated by its position relative to the actual or calculated vehicle turning center 127 (see FIG. 6).

In some embodiments, the steering motor 202 and wheel assembly 120 may allow continuous rotation of the wheel assembly about the spindle axis 126 (i.e., the steering motor 202 may infinitely, and bi-directionally, rotate the wheel assembly 120). As a result, the wheel assembly 120 may rotate between a current steering angle and a new steering angle via the smallest angular movement possible, minimizing tire wear and ground surface/turf damage. Moreover, as further described below, since the wheels 108 do not trail the spindle 128, the wheels 108 may be bi-directional during travel in that they may rotate in either direction (e.g., clockwise or counterclockwise) about their respective axes 124 (see FIG. 2). Such a configuration may permit changes in vehicle direction with less wheel assembly rotation than would occur with a conventional caster wheel ZTR. As an example, going from straight, forward travel to straight, rearward travel would require each front wheel of a conventional ZTR to rotate about its vertical spindle axis 180 degrees. However, embodiments like those described herein can achieve the same result without any rotation about the spindle axis (i.e., the wheel 108 can merely reverse rotational direction about its axis 124). In fact, by allowing rotation (during travel) of each wheel 108 in either rotational direction about its axis 124, front wheel assemblies 120 like those described herein may reposition its corresponding front wheel between any two steering angles, within the entire 360 degree steering range, via rotation (clockwise or counterclockwise) of 90 degrees or less about the spindle axis 126. As a result, less turf/ground surface damage, and less tire wear, may result.

In the illustrated embodiment, a separate steering motor 202 is associated with each wheel assembly 120 (see FIG. 1). However, other embodiments may provide a single motor capable of positioning both wheel assemblies 120. For example, the steering motor 202 could drive one wheel assembly 120 (e.g., 120b) directly as described above, and drive the other wheel assembly (e.g., 120a) via a mechanical connection (e.g., belt or chain drive) associated with the steering motor (e.g., the shaft 204) or some part of the wheel assembly. In another embodiment, the steering motor could be remotely located from each of the front wheels (e.g., intermediate the two front wheels) and connected to each of the wheel assemblies through a mechanical (e.g., belt or chain) interface.

The steering system 200 may further include a sensor or switch 203 and a control system 210 as shown in FIG. 2. In the illustrated embodiment, the switch 203 is adapted to assist in initializing the steering system 200 once the mower is started. For example, when the mower 100 is powered on, each steering motor 202 (or the control system 210) may initialize to a steering angle of zero degrees (assuming the control levers 110 are in a neutral configuration as shown in FIG. 1). To perform this startup initialization, each steering motor 202 may rotate its output shaft 204 until a target 208 provided on the coupler 205 (or alternatively on the spindle 128 or output shaft 204) is positioned proximate the switch 203. As shown in FIG. 2, each steering motor 202 may also include one or more harnesses 211 connecting the steering motor to electrical power and/or to other parts (e.g., to the control system 210 as further described below) of the steering system 200. With the motors initialized to zero at startup, any steering angle command may be calculated as a relative angle from zero.

While different switch configurations are certainly possible, the switch 203 may, in one embodiment, be a proximity switch such as a model BI15-M30E-LIU-H1141 available from Hans Turck GmbH and Co. of Germany. The switch 203 may be mounted within a passage 207 formed in the adapter 132, and the proximity target 208 may be located or formed on a peripheral surface of the coupler 205 (e.g., a square step or protrusion). At system/steering motor initialization, an algorithm may cause the steering motor 202 to rotate the output shaft 204 until the target 208 is aligned with the switch 203. Again, the steering system 200 may recognize this aligned position as the respective wheel 108 being oriented straight ahead (e.g., its steering angle being equal to zero).

In alternate embodiments, the steering system 200 may utilize motors that are capable of determining absolute steering angle, i.e., the motors may include, or otherwise receive input from, steering angle sensors (see sensor 209 described below and shown in FIG. 5). Such steering angle sensors may, at any given time, provide absolute steering angle signals to the steering system 200. Accordingly, reliance on an initialization sequence as described above would be unneeded. Rather, at startup, the front wheels could simply maintain the steering angles present when the mower 100 was turned off.

By providing a steering system 200 with such absolute steering angle feedback capability, the target 208/switch 203 described above would be unnecessary. Moreover, startup behavior could advantageously mimic a typical ZTR vehicle in that little or no front wheel movement would occur until commanded. Again, tire wear and potential ground surface/turf damage may accordingly be reduced.

Figure 3:
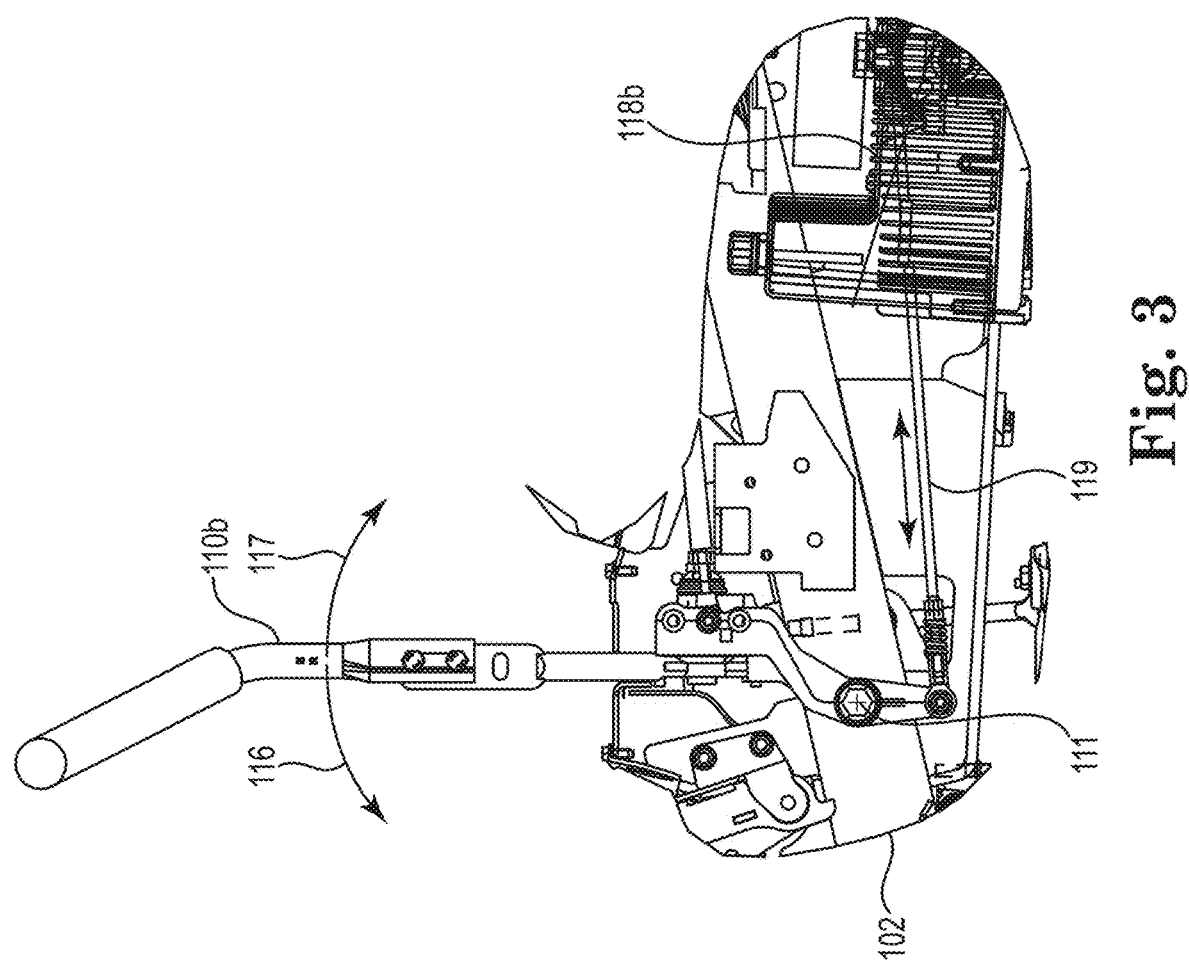
FIG. 3 is a partial section view of the vehicle of FIG. 1 illustrating a portion of an exemplary drive control system.
Figure 4:
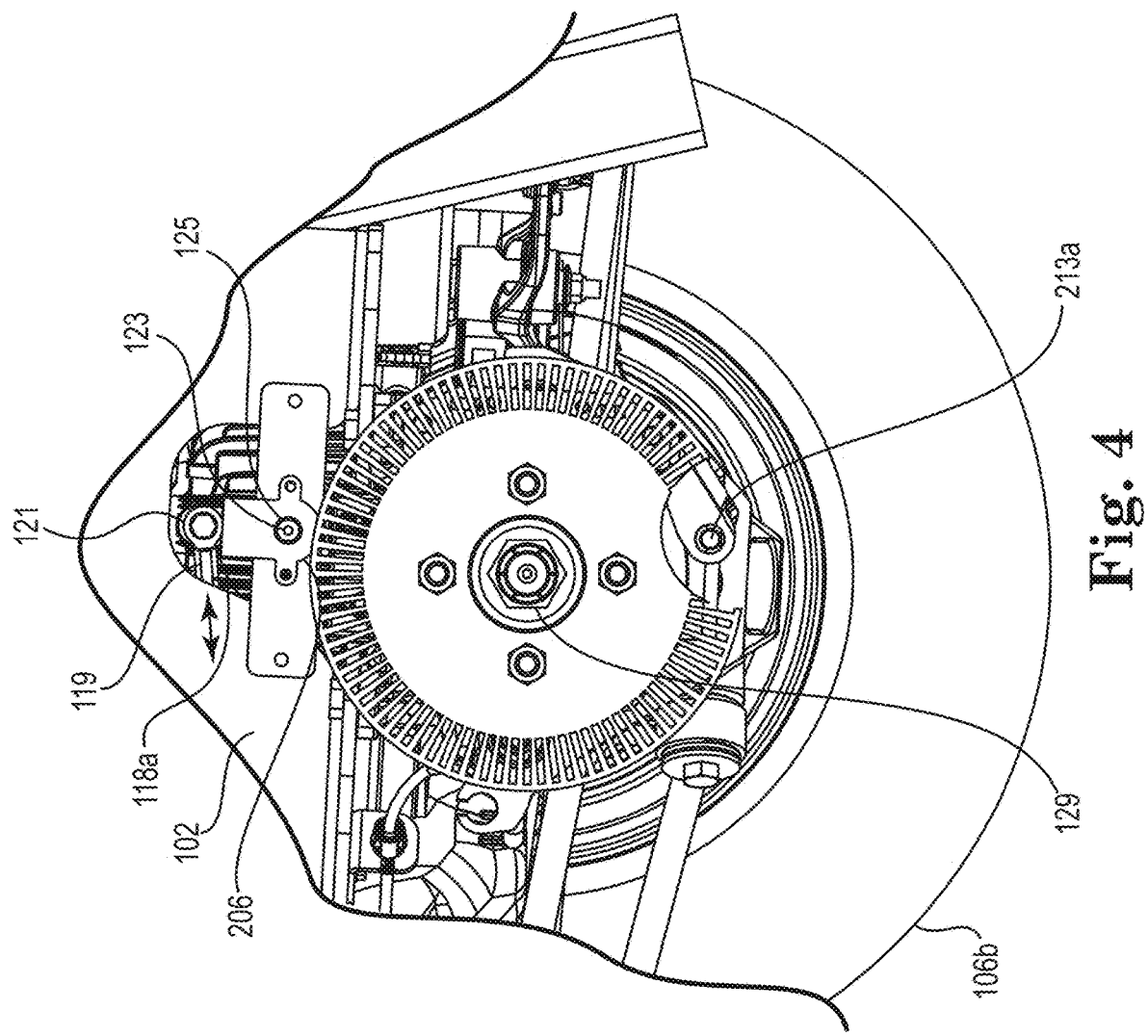
FIG. 4 is a partial left side elevation view of the vehicle of FIG. 1, with a drive wheel removed, illustrating locations for one or both of a drive control lever position sensor and a drive member (e.g., wheel) sensor.

FIGS. 3 and 4 illustrate a portion of one embodiment of the steering system that may provide the intended monitoring of lever 110 positions. As shown in the partial section view of FIG. 3, the drive control lever 110b is pivotally mounted to the frame 102 such that it may pivot about the axis 111 as described above. While illustrating the drive control lever 110b controlling its associated hydrostatic transmission 118b (for the right drive wheel 106b), it is understood that the drive control lever 110a, transmission 118a, and their associated components are substantially the same (e.g., mirror images) of what is shown in FIG. 3.

While described herein as using dual independent hydrostatic transmissions 118, such a configuration is not limiting. For example, the drive system could alternatively include other types of infinitely variable transmissions (e.g., electrical or mechanical variable transmissions), a single transmission (e.g., integrated hydrostatic transaxle), separate hydraulic motors with separate (or single) pumps, an electrically controlled transmission, and one or more electric motors.

Each drive control lever 110 may be pivotal (about the axis 111) through a range of motion that encompasses movement (from a neutral position as shown) in a first or forward direction 116, as well as in a second or reverse direction 117. As the lever 110 moves in the forward direction 116, it causes a transmission link 119 to move rearwardly, displacing a lever arm 121 of the transmission 118 rearwardly as indicated in FIG. 4 (note that FIG. 4 illustrates the left side transmission 118a). Likewise, as the lever 110 moves in the reverse direction 117, it causes the link 119 to move forwardly, correspondingly displacing the lever arm 121 forwardly. When the control lever is in the neutral position shown in FIG. 3, the lever arm 121 (see FIG. 4) is in a corresponding neutral position such that the associated drive wheel 106 is typically stationary. While the transmission link 119 is illustrated as a mechanical tie rod, the link could, in other embodiments (e.g., wherein the drive system is configured as one or more electric motors) be an electrical interconnection (e.g., drive-by-wire)).

Each lever arm 121 is connected to a rotatable input shaft 123 that extends into a casing of the transmission 118 where it attaches to an internal swashplate that controls hydraulic flow. Accordingly, when the lever arm 121/input shaft 123 rotates, the speed and direction of the transmission's output shaft 129 (and, therefore, the associated wheel 106) may change. For example, as the control lever is moved incrementally in the forward direction, the transmission 118 proportionally increases the speed and direction of its associated drive wheel to correspond to the position of the control lever. When the control lever 110 is at a full forward position (e.g., also referred to herein as "100%" position, with neutral being the "0%" position), the lever arm 121 is positioned to rotate the drive wheel 106 at a maximum forward speed (e.g., about 10 miles/hour), and when the control lever is at a midpoint between the neutral position and the full forward position (e.g., a "50%" position), the lever arm is positioned to rotate the drive wheel 106 at half the maximum forward speed (e.g., about 5 miles/hour). Similarly, incremental changes in speed of each drive wheel 106 in reverse occur when the associated control lever 110 is moved to positions between the neutral position and a full reverse position (e.g., "−100%" position). As a result, the mower 100 may be able to turn about most any turn center (including a turn center positioned between the two rear wheels) by selective positioning of the two control levers 110.

The steering system 200, as mentioned above, may assist the mower's differentially steered rear wheels by also actively steering the front wheels 108. To determine the appropriate steering angle for each front wheel 108, embodiments of the steering system 200 may include a sensing device, e.g., lever position sensor 206 (see FIG. 4), associated with each control lever 110. Each lever position sensor 206 is operable to detect or measure where its associated lever 110 is positioned within its respective travel range.

The lever position sensor 206 may be located at most any position along the mechanical linkage connecting the control lever to its respective transmission. For example, the sensor 206 may be positioned at most any location relative to the control lever 110, the link 119, the arm 121, or the input shaft 123. In the illustrated embodiment, the sensor 206 is attached to the frame 102 near the interconnection between the lever arm 121 and the input shaft 123 as indicated in FIG. 4. Again, a sensor 206 is typically provided on both the left and right sides of the mower (e.g., associated with each link 119a, 119b) to provide feedback as to the position of each of the drive control levers 110a and 110b.

While various sensing devices are possible (e.g., a series of switches, or most any mechanical, electrical, or optical sensor), the lever position sensor 206 is, in one embodiment, a Hall effect through-shaft contactless sensor as indicated in FIG. 4. An example of such a sensor is a model PST-360 sensor distributed by Piher Sensors and Controls SA of Tudela, Spain. The sensor 206 may be mounted to the frame 102 such that the input shaft 123 of the transmission 118 engages the sensor. For example, the shaft 123 may include one or more flats 125 that engage a rotatable ring receiver of the sensor 206, the ring having corresponding flats. As the shaft 123 rotates in synchronization with movement of the lever 110, the ring of the sensor 206 may rotate relative to a fixed body of the sensor, generating a signal corresponding to the specific rotation of the shaft. Accordingly, an output position signal of the sensor 206 may be calibrated to reflect a position of the lever 110 (which may also equate to a no-load speed of the associated drive wheel) and such output signal may be provided to the steering system 200 as further described below.

In some embodiments, an optional drive member sensor 213 could be provided for each of the drive wheels 106 to sense/measure actual drive member speed and/or direction and generate one or more signals (e.g., to a steer controller 220) proportional thereto. While various sensor configurations are possible, one suitable sensor is a two-channel quadrature encoder that uses two phased channel outputs to measure both speed and direction. In one embodiment, the encoder may be a model HQ560-400 distributed by Sensoronix, Inc. of Irvine, Calif., USA. FIG. 4 illustrates the sensor 213 (i.e., the sensor 213a associated with the left drive wheel 106a). The sensor 213 could be used to provide additional information to the steering system 200 as further described below. While shown as an integrated speed and direction sensor 213, other embodiments may utilize separate sensors to detect drive wheel speed separately from wheel direction. Moreover, although not illustrated, the system could utilize other sensors, e.g. inclinometers, accelerometers, true ground speed sensors, external position sensors, and gyroscopes, etc. to provide yet even additional information to the steering system.

Figure 5:
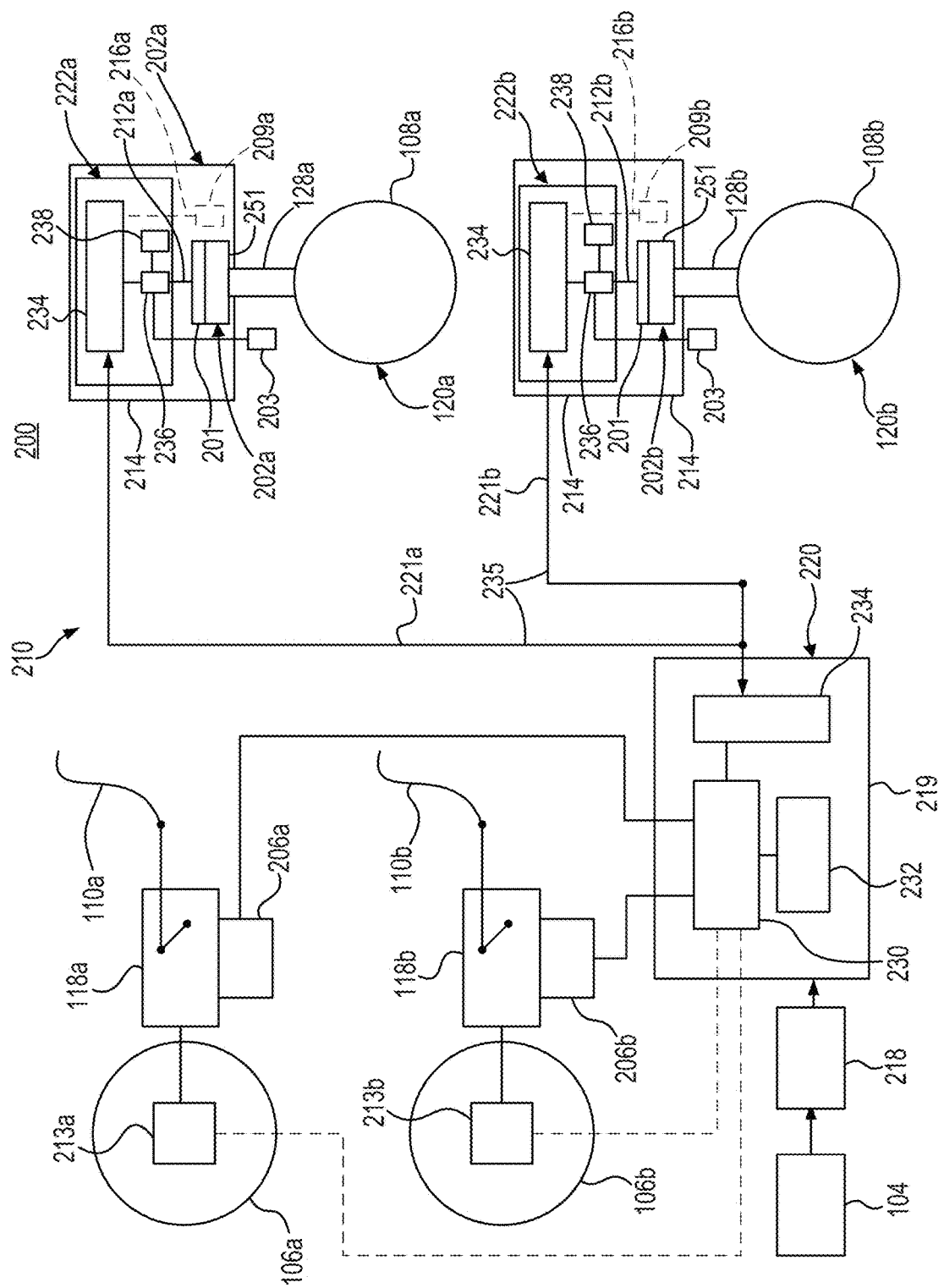
FIG. 5 is a schematic view of an exemplary steering system in accordance with one embodiment of this disclosure.

FIG. 5 illustrates an exemplary schematic diagram of the steering system 200 as it may be incorporated on an exemplary mower. As shown in this view, based upon a position of the drive control levers 110 (or a position of the linkages to the transmissions 118), the lever position sensors 206 may provide instantaneous, raw lever position sensor signals to the processor-based control system 210 carried on the mower. The control system 210 may include software-based algorithms that analyze the lever position sensor signals and calculate a first or left steering angle command 221a for the left front wheel assembly 120a, and a second or right steering angle command 221b for the right front wheel assembly 120b. Each steering motor 202 may then rotate the respective spindle 128 (see also FIG. 2) of its associated front wheel assembly 120 to a steering angle that corresponds to the received steering angle command 221. Again, as one of skill will appreciate, other embodiments (e.g., a tri-wheel vehicle) may require only the calculation of a single steering angle command.

In one embodiment, the control system 210 may include three separate controllers: a steer controller 220 (e.g., contained within a housing 219); and two wheel motor controllers 222a and 222b. While shown as distinct and separate controllers, the steer controller 220 could alternatively be combined with the motor controllers into a single controller and/or housing. Accordingly, the term "controller" may be used interchangeably herein to refer to the steer controller itself or collectively to both the steer controller and motor controllers without limitation.

The steer controller 220 may receive the raw lever position signals or readings (referred to herein as L(t) and R(t), representing, respectively, the position of the left control lever 110a and the right control lever 110b) from the lever position sensors 206a, 206b. In some embodiments, such readings are provided continuously during mower operation, e.g., at defined or variable time periods.

The steer controller 220 may include a processor 230 that receives the raw input signals L(t) and R(t) and executes one or more computer programs or applications stored in memory 232. The memory 232 may include computer-readable instructions or applications that, when executed, e.g., by the processor 230, cause the controller to perform various functions or calculations. That is to say, the processor 230 and memory 232 may together define a computing apparatus operable to process input data and generate the desired output to one or more devices. For example, the processor 230 may receive various input data including raw lever position signals L(t) and R(t) and, as described in more detail below, ultimately generate discrete steering angle commands 221a, 221b corresponding to the desired steering angles of the wheel assemblies 120a, 120b. These commands 221 are ultimately sent to the motors 202 (e.g., via the motor controllers 222), where an appropriate steer command 212 (based upon the angle command 221) is generated and provided to the associated motor unit 201.

In view of the above, it will be readily apparent that the functionality of the controller 220 (and the controllers 222) may be implemented in any manner known to one skilled in the art. For instance, the memory 232 may include any volatile, non-volatile, magnetic, optical, and/or electrical media, such as a random access memory (RAM), read-only memory (ROM), non-volatile RAM (NVRAM), electrically-erasable programmable ROM (EEPROM), flash memory, and/or any other digital media. While shown as both being incorporated into the controller 220, the memory 232 and the processor 230 could be contained in one or more separate modules.

The processor 230 may include any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 230 may include multiple components, such as any combination of one or more microprocessors, one or more controllers, one or more DSPs, one or more ASICs, and/or one or more FPGAs, as well as other discrete or integrated logic circuitry. The functions attributed to the controller 220/processor 230 herein may be embodied as software, firmware, hardware, or any combination thereof.

While illustrated as separate components for purposes of this description, those of skill in the art will realize that the components of the steer controller 220 (as well as the components of the motor controllers 222) may be combined without departing from the scope of the invention. For example, components of the controller 220 may be configured as at least one microcontroller, system on a chip (SoC), or system in a package (SiP) wherein various components (e.g., the processor 230, memory 232, communication chips, etc.) are formed as a single integrated circuit.

The steer controller 220 may communicate with the left and right motor controllers 222 via any acceptable interface. For example, the interface may be configured as a Controller Area Network (CAN) bus 235 wherein the steer controller 220 and each of the left and right motor controllers 222a, 222b form nodes on the bus that communicate with other nodes via transceivers 234. Of course, other communication protocols (serial bus and other wired or wireless protocols) are certainly possible.

Like the steer controller 220, each of the left and right wheel motor controllers 222 may further include a processor 236 and memory 238 that may be configured in any manner (e.g., form an integrated microcontroller) as already described above with reference to the steer controller. In some embodiments, a motor housing 214 may contain not only the motor 202 (e.g., motor unit 201, reducer 251, and related hardware), but the motor controller 222 as well.

In one embodiment, communication between the steer controller 220 and the motor controllers 222 is open-loop, i.e., the motor controllers do not provide feedback regarding the actual steering angles to the steer controller. Instead, the motors may initialize at startup (e.g., using the switch 203) to a zero angle as described above after which commanded steering angles are determined relative to this zero (straight-ahead) position.

However, as shown in FIG. 5, each of the motors 202 may (in addition or in lieu of the switch 203) include the steering angle sensor 209. The sensor 209 may detect/measure an absolute steering angle of the front wheel assembly 120 (about the spindle axis 126) at any time and provide a signal 216 (216a, 216b) corresponding to that absolute, measured steering angle to its respective motor controller 222 (this signal 216 may be communicated to the steer controller 220 via the bus 235). By incorporating the steering angle sensor 209, control of the steering motors 202 by their respective controllers 222 may be based upon closed-loop feedback. While described as being incorporated into the steering motor, other embodiments may locate the sensor 209 externally (e.g., adjacent the spindle 128 of the wheel assembly 120).

In some embodiments, the control system 210 may further utilize other sensor input including information regarding speed of the mower (e.g., using the drive wheel sensor 213 associated with each wheel 106a, 106b) to calculate the steering angle commands. Such an embodiment may allow for steering commands that account for external factors (e.g., hydraulic response, wheel torque loading, etc.) that could otherwise alter the calculated steering angle.

The sensors, control system 210 (controllers 220 and 222), and steering motors 202 may receive electrical power from an electrical energy source 218 carried by the mower 100. The energy source may be one or more of an alternator, generator, fuel cell, or electrical storage device such as a battery or capacitor. The energy source may be powered by the prime mover 104 during vehicle operation.

FIG. 6 is a diagrammatic view of one embodiment of the mower 100 showing parameters used by the exemplary steering system to calculate the steering angle of each front wheel 108a, 108b when turning about a turn center 127. As shown in this view, the mower may include the centerline axis 109 that is midway between the two rear wheels 106, wherein the right front wheel 108b may be offset farther from the axis 109 than the left front wheel 106a. Assuming a right turn, the steering angle $A_i$ of the "inner" (right) front wheel 108b and the steering angle $A_o$ of the "outer" (left) front wheel may be mathematically expressed, respectively, as shown in Equations 1 and 2 below. Equations 1 and 2 are based upon known Ackermann steering equations.

$$A_i = \tan^{-1} \frac{2W_b(\omega_o + \omega_i)}{W_{fi}(\omega_o - \omega_i) + Wr(\omega_o + \omega_i)} \quad 1)$$

$$A_o = \tan^{-1} \frac{2W_b(\omega_o - \omega_i)}{W_{fo}(\omega_o - \omega_i) + Wr(\omega_o + \omega_i)} \quad 2)$$

wherein:
$A_i$=steering angle of the inner front wheel;
$A_o$=steering angle of the outer front wheel;
$\omega_b$=wheelbase (axle-to-axle) of the mower;
$\omega_o$=angular velocity of the outer drive wheel 106 (e.g., actual velocity or velocity derived from the control lever position (L(t) or R(t)) associated with the outer drive wheel);
$\omega_i$=angular velocity of the inner drive wheel 106 (e.g., actual velocity or velocity derived from the control lever position (L(t) or R(t)) associated with the inner drive wheel);

$W_{fi}$=front inner wheel offset from the axis 109;
$W_{fo}$=front outer wheel offset from the axis 109; and
$W_r$=rear track (wheel center-to-center) width.

In the illustrated embodiment, the variables $\omega_o$ and $\omega_i$ are actually derived from (e.g., are proportional to) the positions of the respective drive control levers 110 during mower operation. As a result, for any given position of each of the drive control levers 110, the control system 210 (e.g., controller 220) may calculate a steering angle for each of the inner front wheel ($A_i$) and the outer front wheel ($A_o$) (the remaining parameters will be generally constant for any given vehicle configuration). The controller 220 may determine what is the "inner" and "outer" wheel for each turn by the magnitude of the variables $\omega_o$ and $\omega_i$.

As one can appreciate, whether a wheel is designated as the "inner" drive wheel or the "outer" drive wheel will change based upon turn direction. Accordingly, to simplify the remainder of this description, and to avoid confusion with regard to the inner and outer wheel designations, the variables introduced below are identified by some variant of left ("L") and right ("R").

In some embodiments, Equations 1 and 2 may be modified such that an algorithm defining the relationship between drive control lever position and steering angles $A_i$ and $A_o$ is not linearly proportional. For example, the wheel speed sensors 213 (see, e.g., FIG. 5) may be used to further influence the steering angle calculation. Although not shown herein, such a signal may be utilized in the calculations of the steering angles to account for other factors (e.g., actual drive wheel speed resulting from wheel slip, wheel load, or drive system efficiency). Again, other sensors such as inclinometers, accelerometers, true ground speed sensors, external position sensors, and gyroscopes may also be provided and their respective signals utilized to modify the inputs to, or the outputs from, Equations 1 and 2.

The decision to utilize at least the position of the control levers 110 as opposed to just the drive wheel speed may provide various benefits. For example, if the steering system were to rely solely on actual drive wheel speed in Equations 1 and 2 above, the drive wheels would need to begin turning before the control system 210 could calculate and manipulate the steering angles of the front wheels. To initiate a turn, slip may occur in either or both drive wheels, or the front wheels may begin to break traction and slide. Yet, various factors (e.g., hysteresis of the hydrostatic transmissions, hydraulic efficiency/leakage of the transmission, resistance to rolling of the drive wheels (e.g., mower is heading uphill), and engine throttle setting) may all contribute to drive wheel response that lags the speed commanded by the control levers. On the other hand, the positions of the control levers provide the steering system with the operator's intended direction/heading regardless of actual drive wheel speed. Accordingly, even when the drive wheels deviate from the assumed relationship to the lever position (e.g., the wheels are slow to respond or are under significant load), the steering angles of each front wheel may be set based upon the intended and calculated direction of travel.

Using the instantaneous, raw lever position signals as the basis for determining inputs to the Ackermann steering equations (see Equations 1 and 2 above) may thus provide the desired steering angle for each front wheel, at least for generally static control lever positions. However, it has been found that using such a direct correlation between control lever position and steering angle may present drawbacks during more typical, dynamic mower operation.

For instance, one problem identified when the control system 210 relies only on the instantaneous control lever positions as the basis for determining inputs to the Ackermann equations is abrupt steering angle changes (e.g., "twitchy" steering), especially when the control levers are at or around neutral (at or near 0% position). This is primarily attributable to sensitivity of the lever position sensors 206 (see FIG. 5), wherein very small displacements of the levers (when at or near 0% position) can cause sensor readings interpreted by the steer controller as a turn input. Such an interpretation results in the steering angles of the front wheels rapidly changing or "twitching" while the mower 100 is otherwise stationary.

Another problem presented by the use of instantaneous control lever positions as the basis for determining inputs to the Ackermann equations is that, for certain control lever positions, the calculation of the steering angles can be indeterminate. For example, when both levers are at or near neutral (at 0% positions), the steering angle calculations executed by the Ackermann equations are indeterminate (e.g., when $\omega_o$ and $\omega_i$ are zero, $A_i$ and $A_o$ in Equations 1 and 2 above are indeterminate). This can lead to various operational inconsistencies. For example, if the right control lever 110b (see FIG. 5) is held in the neutral (0%) position, and the left control lever is positioned for reverse rotation of the left wheel (e.g., at −50% position), the mower 100 will calculate steering angles (using the Ackermann equations) that yield a "pivot turn" or turn center generally centered at the point of contact between the ground surface and the right wheel 106b (see FIG. 6). If the operator then moves the left control lever 110a forward through neutral to a forward position (e.g., 50% position), the steering angles should remain the same, i.e., the turn center should remain at the right wheel/ground surface contact point. However, as the left control lever moves through the 0% position, the instantaneous Ackermann calculations produce an indeterminate steering angle. As a result, unpredictable steering response may be experienced during this and similar "through zero" control lever movements. As a result, instead of a smooth transition from a counterclockwise turn about the right wheel/ground contact turn center to a clockwise turn about the same turn center, the front wheels may instead abruptly transition to unintended steering angles before returning to the desired turn center as the left control lever moves through neutral into a forward position. As one can appreciate, such a response is both undesired and unexpected to the user.

Yet another problem that presents itself when using the instantaneous lever position signals as the basis for determining inputs to the Ackermann equations is that the front wheels 108 of the mower 100 may also display twitchy behavior during low speed mower movement (e.g., due to the turn center of the mower changing more rapidly (based on control lever position changes) at lower speed). While this characteristic is also evident with conventional ZTR vehicles, its effect is attenuated by the passive casters effectively slowing the front wheel steering response. With actively steered vehicles, however, the issue may (unless addressed as described herein) be more noticeable as even slight changes in control lever positions, whether intended or unintended, can be interpreted by the steer controller 220 as an instantly commanded left or right turn.

By way of illustration, if the left and right control levers 110a, 110b are both nominally positioned at 8% (forward), the control levers have a lever differential ratio or "LD ratio" of 8/8 or 1, resulting in the steering angle of each front wheel being zero (straight-line travel). However, if each control lever is moved (e.g., unintentionally) 1% (e.g., the left control lever 110a moves to 7% and the right control lever 110b moves to 9%), the LD ratio would change to 7/9 or 0.78. Although such control lever movement is minimal (e.g., the operator intends to maintain straight-line travel), such a LD ratio may be interpreted by the steer controller 220 as a command to execute a left hand turn. For example, in one typical mower configuration, such an LD ratio may result in an Ackermann-calculated steering angle (heading) of 10 degrees (measured from straight ahead travel). While this characteristic is prominent at lower speeds, its effects are lessened at higher speeds as such slight differential lever positions produce a smaller effect. For instance, at control lever positions of 80%, the same variation of +/−1% would produce only a slight change (e.g., 79/81 or 0.98) in LD ratio, yielding an Ackermann-calculated steering angle of only 2 degrees.

For an actively steered ZTR vehicle, it is desirable to align the turn centers of the front and rear wheels for the purpose of minimizing turf tear, amongst other things, as well as to maximize steering control and efficiency (e.g. minimizing tire scrub). For improved controllability, the response of the ground drive system is typically dampened, especially at low speed. "Dampening," as used herein refers to any time-based slowing of a response (e.g., the steering response) to an input (e.g., steering angle command 221). This dampening is generally accomplished through tuning a combination of characteristics including hydraulic inefficiencies, frictional losses, and other specific parameters of the hydraulic transmissions. Utilizing raw, instantaneous control lever position signals in the Ackermann equations to calculate steering angle outputs results in an under dampened front steering response. This causes the front wheels to immediately steer to the calculated steering angle. As a result, the front wheels may reach the intended turn center or steering angle before the drive wheels reach the desired turn center.

Control systems 210 in accordance with embodiments of the present disclosure may be configured to address these and other issues associated with using instantaneous or raw control lever input signals as the basis for Ackermann-calculated steering angles.

Figure 7:
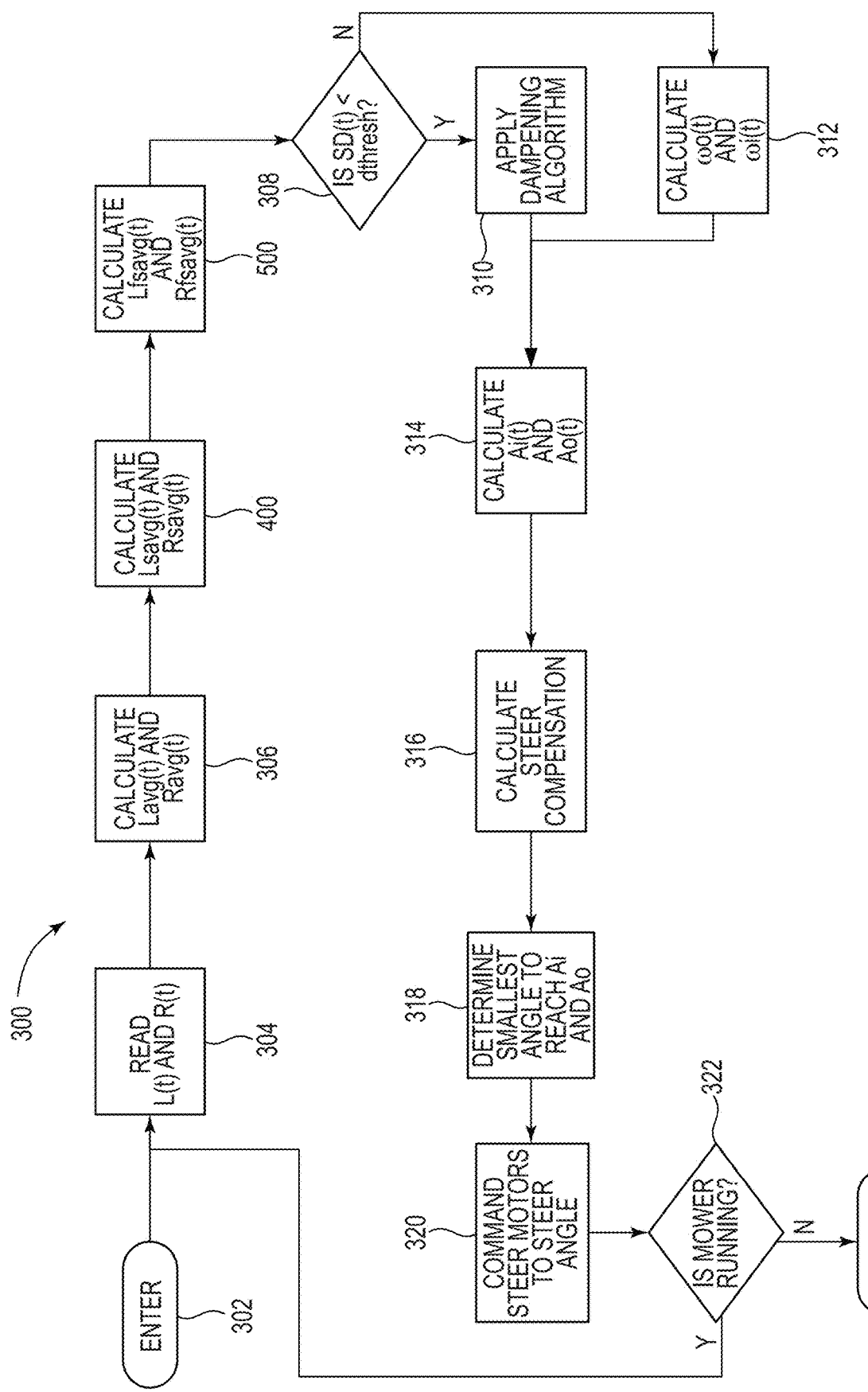
FIG. 7 is a flow chart illustrating a steering calculation process in accordance with one embodiment of the disclosure.

With reference initially to FIG. 7, an exemplary process 300 that may be executed by the control system 210 of FIG. 5 to control steering angles of the front wheels is shown. Although described with some degree of specificity, the process 300 is exemplary only, and control systems that vary in operation from that presented herein are certainly contemplated.

As an initial matter, and as indicated in FIG. 7 (see block 322), the process 300 may continuously loop (e.g., based upon a predefined time period) during mower operation. Moreover, as described below, some of the exemplary process 300 may occur prior to (e.g., "pre-processing") the Ackermann calculations (e.g., occur prior to the calculation of $A_i$ and $A_o$ at 314 in FIG. 7). As further explained below, this pre-processing may alter the actual values of the control lever position signals that will ultimately be used to calculate drive wheel velocities as inputs to the Ackermann steering angle calculations each time they are executed. While described below, some of the "pre-processing" steps (e.g., filtering, dampening, and state machine) could, in other embodiments, be done after the Ackermann calculations, e.g., as a "post-processing" step.

Furthermore, additional "post-processing" may occur after the Ackermann calculations are complete as indicated by steps 316, 318, and 320 in FIG. 7 and further described below.

The process 300 may be entered at 302. Positions of the left and right control levers 110a, 110b are, as already described herein, monitored by the steer controller 220 at 304 using the sensors 206a and 206b, respectively. Electrical signals corresponding to these raw sensor readings (i.e., L(t) and R(t)) are then received by the steer controller 220 for each loop of the controller. Again, the time period between loops may be fixed or variable. Alternatively, the time period could be dynamically adjusted by the control system during mower operation In order to minimize the "twitching at neutral" problem identified above, embodiments of the present disclosure may provide a "neutral band" encompassing the neutral or 0% position of each control lever wherein the lever position is assumed to be 0%. That is to say, the steer controller 220 may treat any control lever input within a neutral band extending around neutral as being equal to 0% position. While not wishing to be bound to any specific range, the neutral band may, in one embodiment be +/−2% to +/−4%, e.g., +/−3% (while shown as a symmetric band, other embodiments may utilize asymmetric (e.g., −2% to 3%) ranges). Accordingly, in the embodiment described, when the control lever 110 is anywhere between 3% position and −3% position, the steer controller will utilize 0% position for any calculation.

While this neutral band may partially address the neutral twitching issue, increasing the neutral band range adversely affects (i.e., reduces) the resolution/response of the control levers 110 as now the effective lever range is reduced by the size of the neutral band. For example, with a neutral band of +/−3%, the forward speed range (e.g., 0-10 miles/hour) is now compressed into a smaller (3% smaller) control lever throw. Accordingly, the resolution of the control levers is reduced. For this reason, increasing the neutral band beyond a certain range may be undesirable.

Based upon raw sensor readings L(t) and R(t), the steer controller 220 may calculate a dynamic running average of the left (Lavg(t)) and the right (Ravg(t)) lever position signals at 306 based upon mathematically averaging the current sensor readings with previous readings.

As used here, the suffix or subscript "t" or "(t)" indicates a current value of the related variable (e.g., L(t) is the current reading of the left control lever position sensor 206a). Similarly, the suffix or subscript "t−1" or "(t−1)" indicates the immediately preceding control loop value of the related variable (e.g., L(t−1) is the reading of the sensor 206a immediately preceding the current reading). Similarly, "t−2" or "(t−2)" would indicate a value immediately preceding the value at t−1, "t−3" or "(t−3)" would indicate the value immediately preceding t−2, etc. Moreover, the actual time periods (difference in time between: (t) and (t−1); (t−1) and (t−2); etc.) utilized by the control system 210 may be any time period that allows the control system to provide the desired steering control. In some embodiments, the time period may be within a range of 10 milliseconds (ms) to 1000 ms. For example, time periods of 10 ms, 50 ms, 100 ms, 250 ms, and 500 ms are contemplated. Moreover, the time period need not be fixed and, in fact, may be variable as a function of different operating parameters.

In one embodiment, the running averages Lavg(t) and Ravg(t) may be calculated as shown in Equations 3 and 4 below.

$$Lavg(t) = \frac{(L(t) + L(t-1) + L(t-2) + \ldots + L(t-n))}{(n+1)} \qquad 3)$$

$$Ravg(t) = \frac{(R(t) + R(t-1) + R(t-2) + \ldots + R(t-n))}{(n+1)} \quad 4)$$

wherein:
L(t) and R(t)=current readings from sensors 206(*a*) and 206(*b*), respectively;
L(t−1) and R(t−1)=sensor readings immediately preceding the current sensor readings;
L(t−2) and R(t−2)=sensor readings that occurred two readings prior to the current sensor readings;
L(t−n) and R(t−n)=sensor readings that occurred n readings prior to the current sensor readings; and
n=sample size.

While the sample size could be fixed, it is, in some embodiments, variable based upon current values or L(t) and R(t). For instance, the steer controller 220 may select a sample size that is larger (e.g., 60-80) for a first (e.g., low) speed range of mower operation (e.g., lever positions less than 20%), and smaller (e.g., 10-20) for a second (e.g., high) speed range of operation (e.g., lever positions greater than or equal to 20%). In still other embodiments, the sample size may vary between more than two settings, and may even be infinitely variable.

By calculating a running average of the lever position readings in this manner, the resolution of the position signal may effectively increase. As a result, using the running average instead of the instantaneous readings L(t) and R(t) allows the control system 210 (e.g., the steer controller 220) to minimize or even avoid aggressive and abrupt steering response that may otherwise occur, especially at low mower speeds. That is to say, the running average calculation may at least partially attenuate the problem identified above regarding the loss of natural dampening inherent in passively steered vehicles, and the problem of twitchy, low speed operation. As a result, the vehicle 100 may provide a smoother steering response as compared to the same vehicle lacking such a running average calculation. Accordingly, the variable sample rate has a beneficial effect to the steering outputs, as a higher sample size is beneficial in the lower speed range due to the increased averaging which reduces system responsiveness (e.g. reduces twitchy steering), whereas a smaller sample in the higher speed range is beneficial to increase the system responsiveness.

To address the problem of indeterminate steering angles resulting from the Ackermann calculations when the control lever positions are at (or passing through) 0% position, the exemplary process 300 of FIG. 7 may pass the values of Lavg(t) and Ravg(t) to a steering state algorithm or "state machine" as indicated at 400 to calculate state machine-influenced variables Lsavg(t) and Rsavg(t). The state machine is, in one embodiment, a sub-process executed by the steer controller 220 that analyzes previous and current control lever positions to establish a "state." Based upon the state machine determination at 400, the steer controller 220 may calculate Lsavg(t) and Rsavg(t). Either or both of the variables Lsavg(t) and Rsavg(t) may be set equivalent to Lavg(t) and Ravg(t), respectively. Alternatively, either or both of Lsavg(t) and Rsavg(t) could be set to an earlier value determined by the state machine (e.g., Lsavg(t) set to Lsavg(t−1) and/or Rsavg(t) set to Rsavg(t−1), respectively). That is to say, one or both of Lsavg(t) and Rsavg(t) may, in some circumstances, be equivalent to value(s) previously determined by the state machine rather than a value derived from the current values of Lavg(t) and Ravg(t). The values of Lsavg(t) and Rsavg(t) may, after additional processing, then be used in the subsequent calculations as shown in FIG. 7 to determine the actual steering angle commands to be issued to the motor controllers 222. By operating in this manner, the state machine output may maintain a previously-commanded steering angle of one or both of the front wheels if the state machine cannot determine with reasonable certainty that a new turn center is intended by the operator.

Figure 8:
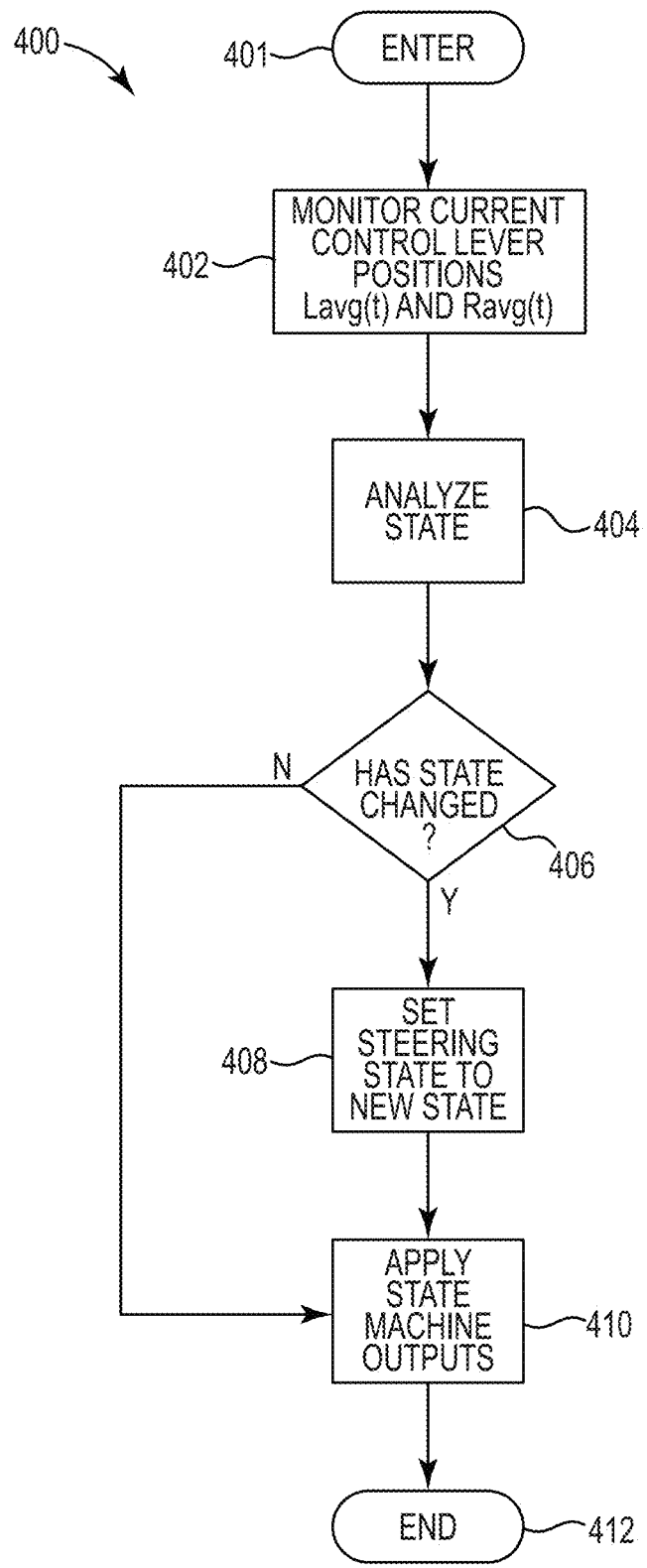
FIG. 8 is a flow chart illustrating an exemplary steering control technique that may be used in the process of FIG. 7.

FIG. 8 is a flowchart illustrating general operation of the state machine 400 in accordance with one embodiment of the disclosure. As shown in this view, the sub-process may be entered at 401. Initially (e.g., at mower start-up), the control system 210 (motor controllers 222) may determine an absolute steering angle of each front wheel using the steering angle sensors 209 (or, alternatively, set the steering angles to zero based upon feedback from the switch 203 in embodiments where the absolute angle sensor is not provided). Moreover, the steer controller 220 may set the current steering state to state 0. The steer controller 220 may then monitor the calculated values of Lavg(t) and Ravg(t) at 402.

For each control loop (time period), the steer controller 220 may analyze the steer state at 404 to determine whether Lavg(t) and/or Ravg(t) indicate a change in steering state at 406. This change may be determined by analyzing the values of Lavg(t) and Ravg(t) and the identity of the previous state. That is to say, a state change may be determined by detecting one of the conditions set forth in Table I below. In general, a change in steering state may occur when movement of either or both of the left and right control levers 110 (see FIG. 5) is detected. In some embodiments, the steering state will change when the value of either Lavg or Ravg changes from: a negative value to either zero or a positive value; a positive value to either zero or a negative value; and zero to either a positive value or a negative value.

In one embodiment, if no change in state occurs, the process may progress to 410 and utilize the values for Lsavg(t) and Rsavg(t) as described in Table II below, and then end at 412 (i.e., return to process 300 of FIG. 7). Otherwise, if a change in state is detected at 406, the process may proceed to 408 and set a new state before progressing to 410.

Figure 9:
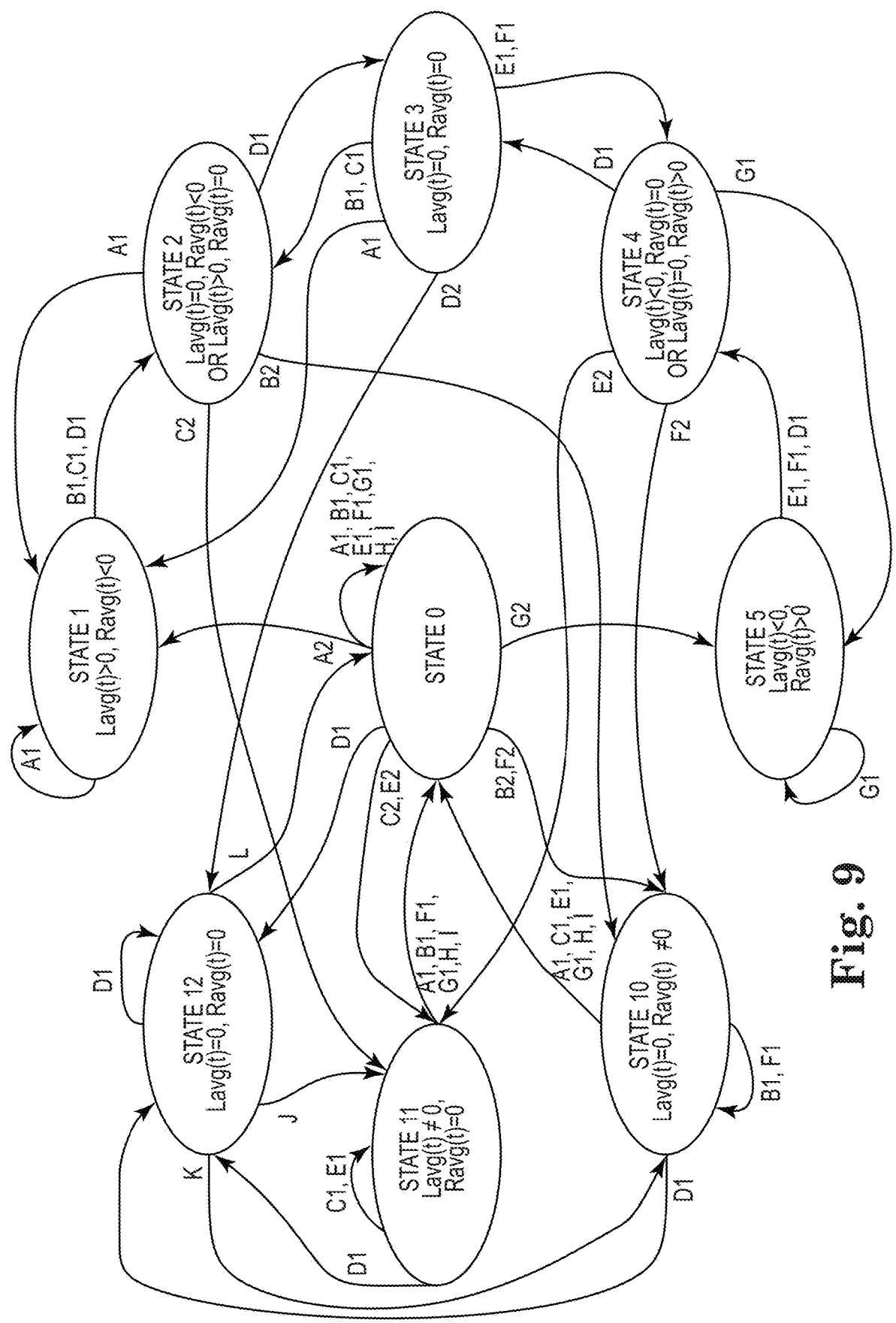
FIG. 9 is a state diagram illustrating a state machine in accordance with one embodiment of the disclosure.

With this general overview, an exemplary state machine or algorithm will be described with reference to the state diagram of FIG. 9 and corresponding Tables I and II. As an initial matter, it is noted that the condition lines in FIG. 9 are uni-directional (operate in the direction of the arrowhead only), and are labeled by condition identifier(s) (e.g., A1, A2, etc.) that correspond to the conditions listed in Table I. Table I relates the condition identifier to an input condition (e.g., to the positions (Lavg(t) and Ravg(t)) of the control levers). Moreover, Table II identifies the values of Lsavg(t) and Rsavg(t) that will be passed for subsequent processing and utilization in the Ackermann calculations.

In general, the state machine is adapted to detect, or distinguish between, various steering conditions or "states" based upon whether each control lever is: at neutral (position equal to =0); set for forward propulsion (position>0); or set for reverse propulsion (position<0). For reasons that will become apparent, the immediately preceding steering state may also be tracked (e.g., by the state machine/steer controller). With this information, the steer controller 220 may determine that the steering inputs (control lever positions) are in one of nine states (state 0, state 1, state 2 (temporary state as described below), state 3 (temporary state), state 4 (temporary state), state 5, state 10, state 11, and state 12). The steer controller may then calculate or otherwise determine values of Lsavg(t) and Rsavg(t) that will provide the desired steering response, even when instantaneous values of control lever position (e.g., one or both are at 0% position) may otherwise yield undesirable and/or indeterminate steering angles. Accordingly, smooth transitions between the different steered headings may result.

In the illustrated embodiment, the control system 210 (e.g., the steer controller 220) may initially set the state to state 0 upon mower start-up. From this point, the control system 210 may continuously monitor the raw signals (e.g., at a fixed or variable loop frequency) from each of the sensors 206a, 206b and calculates Lavg(t) and Ravg(t) as already discussed herein. State 0 is also set when turns having a turn center outside of the drive wheels (see, e.g., turn center 127 in FIG. 6) occur, and when traveling in a straight line (either forward or reverse).

TABLE I

| Condition Identifier | Input Condition |
|---|---|
| A1 | Lavg(t) > 0 & Ravg(t) < 0 |
| A2 | Lavg(t) > 0 & Ravg(t) < 0 for more than x seconds |
| B1 | Lavg(t) = 0 & Ravg(t) < 0 |
| B2 | Lavg(t) = 0 & Ravg(t) < 0 for more than x seconds |
| C1 | Lavg(t) > 0 & Ravg(t) = 0 |
| C2 | Lavg(t) > 0 & Ravg(t) = 0 for more than x seconds |
| D1 | Lavg(t) = 0 & Ravg(t) = 0 |
| D2 | Lavg(t) = 0 & Ravg(t) = 0 for more than x seconds |
| E1 | Lavg(t) < 0 & Ravg(t) = 0 |
| E2 | Lavg(t) < 0 & Ravg(t) = 0 for more than x seconds |
| F1 | Lavg(t) = 0 & Ravg(t) > 0 |
| F2 | Lavg(t) = 0 & Ravg(t) > 0 for more than x seconds |
| G1 | Lavg(t) < 0 & Ravg(t) > 0 |
| G2 | Lavg(t) < 0 & Ravg(t) > 0 for more than x seconds |
| H | Lavg(t) > 0 & Ravg(t) > 0 |
| I | Lavg(t) < 0 & Ravg(t) < 0 |
| J | Lavg(t) ≠ 0 & Ravg(t) = 0 and State(t-1) ≠ 0 |
| K | Lavg(t) = 0 & Ravg(t) ≠ 0 and State(t-1) ≠ 0 |
| L | Lavg(t) ≠ 0 Or Ravg(t) ≠ 0 and State(t-1) = 0 |

During each process loop 300 (see FIG. 7), the control system 210 (e.g., steer controller 220) receives input from the control levers (via the sensors 206a, 206b). The steer controller then compares the input received to the data presented in Table I. For example, from state 0, if Lavg(t) goes positive and Ravg(t) goes negative (e.g., a right zero turn ("zero turn" meaning a turn center located somewhere between the rear wheels)), the steer controller 220 recognizes the input condition as A1 in Table I. In response to condition A1, the steer controller 220 will remain in state 0 as indicated by the loopback reference associated with condition A1 in FIG. 9 (conditions B1, C1, E1, F1, G1, H, and I will also maintain state 0).

Moreover, when the steer controller 220 detects condition A1 (or B1, C1, E1, F1, G1, H, and I) (while in state 0), the steer controller will generate state machine-influenced outputs Lsavg(t) and Rsavg(t) equal to Lavg(t) and Ravg(t), respectively, as indicated by the output for state 0 in Table II.

TABLE II

| State | Output for Downstream Steering Angle Calculations | State Description |
|---|---|---|
| 0 | Lsavg(t) = Lavg(t), Rsavg(t) = Ravg(t), Dampening allowed | Startup position, straight (forward or reverse) travel, and turn center outside of drive wheels |

TABLE II-continued

| State | Output for Downstream Steering Angle Calculations | State Description |
|---|---|---|
| 1 | Lsavg(t) = Lavg(t), Rsavg(t) = Ravg(t) | Right zero turn (turn center between drive wheels) |
| 2 | If Lavg(t) = 0 & Ravg(t) < 0, then Lsavg(t) = Lsavg(t-1), Rsavg(t) = Ravg(t); Else if Lavg(t) > 0 & Ravg(t) = 0, then Lsavg(t) = Lavg(t), Rsavg(t) = Rsavg(t-1) | Right pivot turn (turn center at right drive wheel); temporary state |
| 3 | Lsavg(t) = Lsavg(t-1), Rsavg(t) = Rsavg(t-1) | Neutral; temporary state |
| 4 | If Lavg(t) < 0 & Ravg(t) = 0, then Lsavg(t) = Lavg(t), Rsavg(t) = Rsavg(t-1); Else if Lavg(t) = 0 & Ravg(t) > 0, then Lsavg(t) = Lsavg(t-1), Rsavg(t) = Ravg(t) | Left pivot turn (turn center at left drive wheel); temporary state |
| 5 | Lsavg(t) = Lavg(t), Rsavg(t) = Ravg(t) | Left zero turn |
| 10 | Lsavg(t) = Lavg(t), Rsavg(t) = Ravg(t) | Left pivot turn on left wheel |
| 11 | Lsavg(t) = Lavg(t), Rsavg(t) = Ravg(t) | Right pivot turn on right wheel |
| 12 | If State(t-1) = 0, then Lsavg(t) = Lsavg(t-1), Rsavg(t) = Rsavg(t-1); Else Lsavg(t) = Lavg(t), Rsavg(t) = Ravg(t) | Park or neutral |

If, however, Lavg(t) stays positive and Ravg(t) stays negative for a threshold period of time of x seconds (e.g., 500 milliseconds (ms)) as indicated by input condition A2), the steer controller 220 will change the current state from state 0 to state 1 as shown in FIG. 9 as the controller now recognizes that the operator intends a right zero turn. In state 1, the control system will continue to use Lsavg(t)=Lavg(t) and Rsavg(t)=Ravg(t) as indicated in Table II. However, unlike state 0, a dampening algorithm (described in more detail below) may not be applied.

From state 1, the steer controller 220 may continue to monitor output from sensors 206 and take actions, where appropriate, to change the steer controller output parameters (e.g., for subsequent Ackermann calculations) and/or set a new steering state based upon the previous state and current values of Lavg(t) and Ravg(t). For example, from state 1, if the sensors 206 now indicate that Lavg(t)=0 and Ravg(t)<0, the steer controller 220 may determine the input condition is now B1 (see Table I). Transitioning from state 1 via condition B1 causes the steer controller 220 to set the new state to state 2 as shown in FIG. 9. Moreover, in state 2, the steer controller 220 may set the values for Lsavg(t) and Rsavg(t) based upon the if-then statement presented for state 2 in Table II.

State 2 (as well as states 3 and 4) is a temporary state provided by the steer controller 220 to assist with determining whether the control lever that moved to 0% (neutral) position will remain at zero, or is just transitioning through zero to the opposite (positive to negative and vice-versa) direction. For example, if Lavg(t) remains equal to zero and Ravg(t) remains less than zero for a threshold period of time x (e.g., which may be the same or different than the threshold period x of condition A2), then condition B2 (see Table I and FIG. 9) is recognized. That is, the steer controller 220 recognizes that the operator intends to maintain the left control lever in the neutral position. Condition B2, as shown in FIG. 9, causes the state to change to state 10. In state 10, Lsavg(t) and Rsavg(t) are set, respectively, to Lavg(t) and Ravg(t) (see Table II) and sensor 206 monitoring continues.

By providing the intermediate, transitory state 2 (and states 3 and 4), the steer controller 220 may avoid changing the turn center (i.e., avoid changing the steering angles of the wheels 108) at the instant the left control lever passes through neutral. Rather, the steer controller may utilize the previous value (i.e., Lsavg(t−1)) as indicated in Table II until the controller determines whether the current value of Lavg (t) represents a static control lever position, or is merely indicative of a transition through neutral.

As used in Table II above and described herein, the values of "Lsavg(t−1)" and "Rsavg(t−1)" used by the state machine may refer to the values of those variables during the previous loop. It is to be understood that these variables may reflect the calculated values either before or after: filtering (see sub-process 500 in FIG. 7); and dampening (see sub-process 310 in FIG. 7) were applied. That is to say, although indicated as having passed only through the averaging sub-process and the state machine sub-process, the variables Lsavg(t−1) and Rsavg(t−1) may represent the values of those variables after having additionally passed through the filtering and dampening sub-processes as well, both of which are described in more detail below. As these previous values already represent processing by the filtering and dampening sub-processes, the process 300 of FIG. 7 may, under some circumstances, proceed directly from the state machine at 400 to the Ackermann calculations at 312.

Like condition B1, the steer controller 220 may also transition (from state 1) to state 2 when either conditions C1 (Lavg(t)>0, Ravg(t)=0) or D1 (both Lavg(t) and Ravg(t)=0) exist. If condition C1 exists for a threshold period of time x (e.g., which may be the same or different than the threshold period x of condition A2), then the steer controller 220 may recognize condition C2 (see Table I). As shown in FIG. 9, this will cause the state machine to set the current state to state 11 and set values of Lsavg(t) and Rsavg(t) as shown for state 11 in Table II.

For condition D1, state 2 may again be a transition state, this time transitioning to state 3. Once the state is set to state 3, Lsavg(t) may be set equal to Lsavg(t−1) and Rsavg(t) may be set to Rsavg(t−1) as shown for state 3 in Table II.

From state 3, the steer controller 220 may continue to monitor control lever position signals and, upon detecting various conditions (e.g., B1, C1, D2, A1, E1, or F1; see also Table I), may reset the state as shown by the directional arrows to the identified states (e.g., to state 2 (for conditions B1, C1), to state 12 (for condition D2), to state 1 (for condition A1), or to state 4 (for conditions E1, F1). In any of these condition scenarios, the output values for Lsavg(t) and Rsavg(t) may be set according to the corresponding states as identified in Table II. For instance, once the steer controller 220 recognizes that both control levers are at neutral for a threshold period of time x (i.e., determined that the neutral positions of state 3 are not merely transitory), it may recognize condition D2 and set the current state to state 12 (parked or neutral) as shown in FIG. 9. As Table II indicates, when state 12 is entered (assuming the previous state was not state 0), the steer controller 220 will pass the values Lsavg(t−1) and Rsavg(t−1) for use with the downstream Ackermann calculations. Otherwise, if the previous state was state 0, state 12 would instead use current values for Lsavg(t) and Rsavg(t).

FIG. 9 also describes an initial input (e.g., from state 0) corresponding to a left turn (e.g., Lavg(t) goes negative and Ravg(t) goes positive), wherein the steer controller 220 recognizes the input condition as G1 (see FIG. 9 and Table I). In condition G1, the steer controller 220 maintains state 0 (see loopback reference in FIG. 9) and sets the values of Lsavg(t) and Rsavg(t) to those shown in Table II for state 0.

If, however, Lavg(t) stays negative and Ravg(t) stays positive for a threshold period of time of x seconds (e.g., 500 milliseconds (ms)), input condition G2 is recognized and the steer controller 220 may change the current state from state 0 to state 5 as shown in FIG. 9. In state 5, the control system will continue to use Lsavg(t)=Lavg(t) and Rsavg(t)=Ravg(t) as indicated in Table II. However, unlike state 0, the dampening algorithm (described in more detail below) will not be applied.

From state 5, the steer controller 220 may continue to monitor output from sensors 206 and take actions, where appropriate to change the steer controller output parameters and/or set the state based upon instantaneous readings of Lavg(t) and Ravg(t). For example, if the sensors 206 now indicate that the current control lever positions satisfy conditions E1, F1, or D1 (see FIG. 9 and Table I), the steer controller 220 may set the current state to state 4 and generate values for Lsavg(t) and Rsavg(t) based upon the if-then statement presented for state 4 in Table II. As stated above, state 4 may also be a transitory state for conditions D1 (transitioning to state 3), E1 (transitioning to state 11), and F1 (transitioning to state 10) as shown.

As one can appreciate from the foregoing, the state machine may provide the mower 100 with a more intuitive front wheel steering response by avoiding abrupt steering movements that may otherwise occur as the control levers pass through their respective neutral (0%) positions. This may be accomplished, in the described embodiments, by analyzing the current and previous state (e.g., the steering condition that resulted in a change to the current steering state) and determining whether to use: current lever position values (e.g., Lavg(t) and Ravg(t)); or previously determined values (Lsavg(t−1) and Rsavg(t−1)) as the basis in the downstream Ackermann calculations. That is, the steer controller 220 may, in certain situations, maintain a previous turn center for some period of time even though the instantaneous control lever positions actually reflect a new turn center. As a result, state machines in accordance with embodiments of the present disclosure may ensure that the mower's turn center (the steering angles of the front wheels) does not change until a new turn center is satisfactorily determined.

As a final example, if the mower is in a left hand zero turn (e.g., state 5 where Lavg(t)<0 and Ravg(t)>0) and the operator repositions and holds the left control lever so it is at 0% position (neutral), condition F1 is recognized and the current state is set to state 4. However, if the operator holds the left control lever in this 0% position for the threshold period of time x, then the steer controller 220 will set the state to state 10 (the latter dictated by condition F2 of Table I). While operating in state 4 (see Table II), Lsavg(t) is set equal to Lsavg(t−1) and Rsavg(t) is set to Ravg(t). In other words, the steer controller 220 takes no immediate action to alter the turn center, instead maintaining the current turn center from state 5. Upon reaching state 10 however (see Table II), the steer controller 220 proceeds to set Lsavg(t) equal to Lavg(t) and leaves Rsavg(t) set equal to Ravg(t). That is to say, the steer controller 220, via the state machine, may initially leave the steering angles unchanged as the left control lever is moved from a negative position to the 0% position. However, once the steer controller concludes that the 0% position is not a transitory position (e.g., after the control lever is held in this 0% position for the threshold period of time x), the steer controller may alter the turn center from the left zero turn of state 5 to the left pivot turn of state 10.

The state machine algorithm illustrated in FIG. 9 and Tables I and II is, as stated above, illustrative only. That is, other embodiments may eliminate the state machine altogether (e.g., use programmed condition statements instead). In yet other embodiments, the state machine could utilize more or less states, more or less conditions, or apply different output logic to one or more of the states and still fall within the scope of this disclosure That is to say, the state machine illustrated and described herein is illustrative only.

Returning to FIG. 7, once the left and right control lever position signals have been processed to produce Lsavg(t) and Rsavg(t) at 400, the controller 220 may pass these signals to a noise filter sub-process at 500. The noise filter sub-process may act upon Lsavg(t) and Rsavg(t) to produce filtered left and right control lever position signals Lfsavg(t) and Rfsavg(t). One exemplary noise filter sub-process is illustrated in FIG. 10 and further described below.

The exemplary noise filter may, like the state machine, be a sub-process (e.g., algorithm) executed by the control system 210 (e.g., steer controller 220) to programmatically filter the signals Lsavg(t) and Rsavg(t) to produce corresponding filtered variables Lfsavg(t) and Rfsavg(t), respectively. Generally speaking, the noise filter process is especially beneficial in resolving the issue of low speed steering instability or twitching described above. More specifically, the filtering process may reduce the effects of electronic sensor (206) noise and/or unintended operator input to the control levers (e.g., resulting from traversal of uneven terrain). Filtering may be especially beneficial during low speed operation as, during such operation, the steer controller 220 may ignore (or at least attenuate) not only small unintended changes in the left and/or right control lever positions, but also the effects of electronic noise. As a result, unintended changes in the steering angles of the front wheels 108 (i.e., unintended changes in the turn center) may be minimized.

Figure 10:
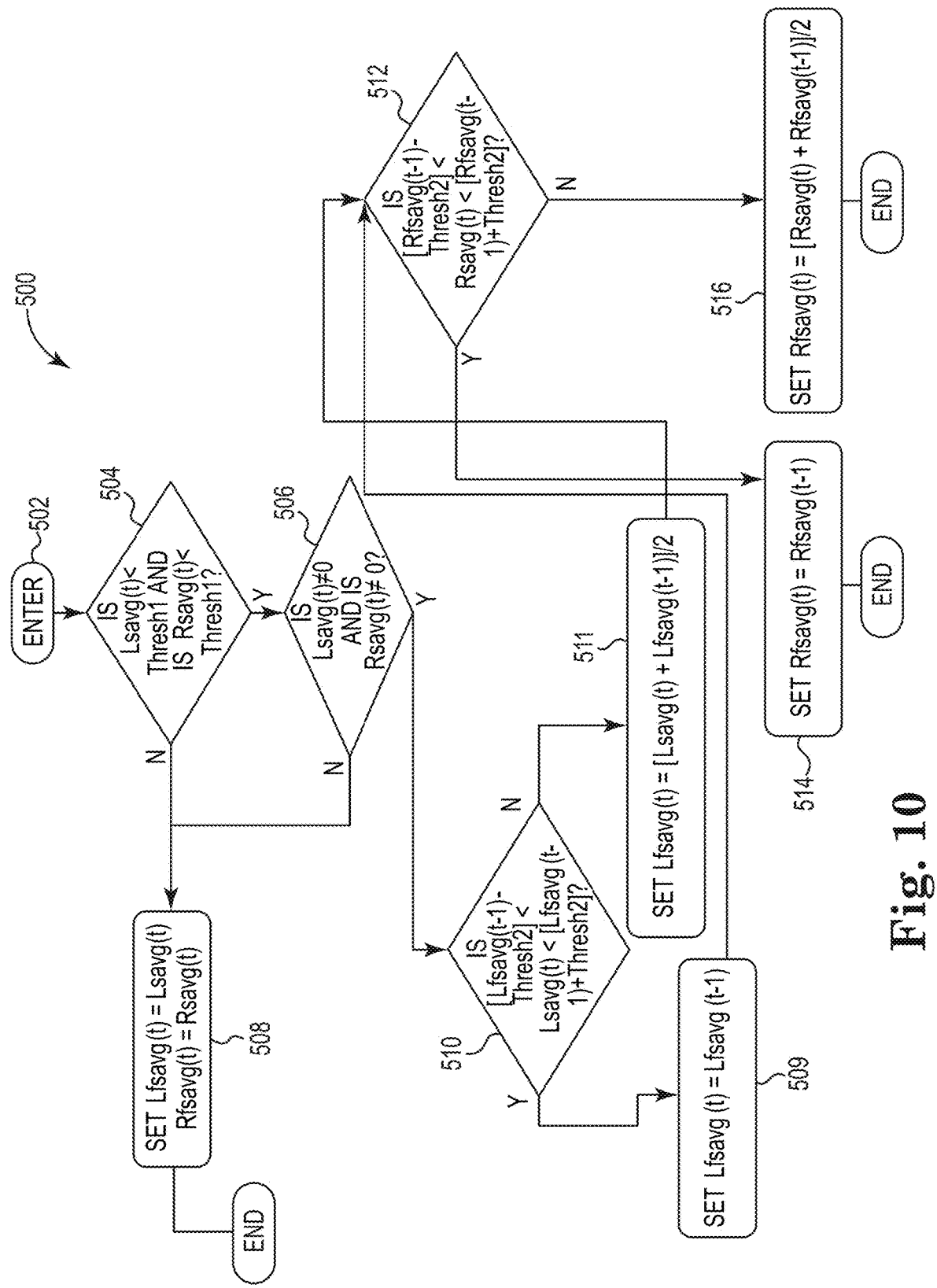
FIG. 10 is a flow chart illustrating an exemplary signal filtering algorithm that may be used in the process of FIG. 7.

As shown in FIG. 10, the exemplary process 500 is entered at 502. As an initial matter, Lsavg(t) and Rsavg(t) may be analyzed to determine if they are both less than a first threshold speed (Thresh1) at 504. Thresh1 may be arbitrarily set to a value of control lever position above which the noise filter is unneeded. For example, in one embodiment, it was found that when either the left or right control lever positions are greater than or equal to 15% (either forward or reverse), the noise filter is unnecessary. Accordingly, if either Lsavg(t) or Rsavg(t) is greater than or equal to Thresh1, the noise filter is bypassed and the "filtered" control lever position readings (Lfsavg(t) and Rfsavg(t)) are set equal to the current readings provided after state machine processing (e.g., Lfsavg(t) is set equal to Lsavg(t) and Rfsavg(t) is set equal to Rsavg(t)) at 508. While the actual values may vary depending on the application, Thresh1 may be set within a range of 5% to 30% (e.g., 15%).

If, on the other hand, the result at 504 is yes, the process proceeds to 506. At this point, the steer controller 220 may compare the current value of Lsavg(t) and Rsavg(t) to determine if both are not equal to 0% (e.g., both are outside of the neutral band). If the result at 506 is yes, then the process proceeds to 510. Otherwise, the process proceeds to 508 as already described above.

At 510, the steer controller 220 may compare the current value of Lsavg(t) to determine if it is greater than the previous filtered value (Lfsavg(t−1)) minus a second threshold speed (Thresh2). Moreover, Lsavg(t) is also analyzed to ensure it is less than Lfsavg(t−1) plus Thresh2. If the answer at 510 is yes, the value of Lfsavg(t) is set equal to Lfsavg(t−1) as shown at 509. If the answer at 510 is no, the value of Lfsavg(t) is set equal to the average of Lsavg(t) and Lfsavg(t−1) as shown at 511.

The process proceeds from both 509 and 511 to 512, where a determination similar to that made at 510 is made for the right control lever as shown in FIG. 10. If the answer at 512 is yes, the value of Rfsavg(t) is set equal to Rfsavg (t−1) as shown at 514. If the answer at 512 is no, the value of Rfsavg(t) is set equal to the average of Rsavg(t) and Rfsavg(t−1) as shown at 516. While the actual values may vary depending on the application, Thresh2 may be set equal to 0.1% to 5%, e.g., 0.3% in one embodiment.

Having processed the raw control lever position sensor readings through the running average process (see 306 in FIG. 7), the state machine process (see 400 in FIG. 7), and the noise filter (see 500 in FIGS. 7 and 10), the process 300 of FIG. 7 may proceed to 308 to determine if the mower steering angles would benefit from dampening. That is to say, the steer controller 220 may determine whether movement of the steerable wheels 108 to a new steering angle should be dampened.

In some embodiments, the control system 210 (e.g., steer controller 220) may analyze the positions of the control levers (e.g., analyze the sensor 206 readings as presented by the values of Lfsavg(t) and Rfsavg(t)) and calculate a control lever or "stick" differential (SD(t) at each time period. SD(t), as used herein, is the absolute value of the difference (as a percentage of total forward or total rearward travel) between the left control lever reading (Lfsavg(t)) and the right control lever reading (Rfsavg(t)). Once SD(t) is determined, it may be compared to a dampening threshold value ("Dthresh"). While Dthresh may vary without departing from the scope of this disclosure, it may, in some embodiments, be 10-15%.

If SD(t) is greater than or equal to Dthresh, then the dampening algorithm may be bypassed and control may pass to 312 in FIG. 7. In this manner, dampening of the control lever position values may only occur during low speed and generally straight-line travel where minimal movement of the control levers can significantly and unintentionally impact the Ackermann steering calculations (see Equations 1 and 2 above).

If, on the other hand, SD(t) is less than Dthresh at 308, control may pass to 310 to execute the dampening algorithm. In general, the dampening algorithm is intended to slow steering motor response to changes in control lever position so that, during low speed, generally straight-line operation, small movements in control lever positions do not result in large changes in steering output (i.e., dampening may address the low speed twitching problem described above). When combined with the use of running averages of the sensor 206 readings, the dampening algorithm may thus assist with more intuitive (and less aggressive) steering response.

In some embodiments, dampening is achieved by modifying the current drive wheel speed (as dictated by signals Lfsavg(t) and Rfsavg(t) received from 500 in FIG. 7) to be used in the Ackermann calculations. That is, instead of utilizing the values of Lfsavg(t) and Rfsavg(t) to determine wheel speeds in the Ackermann equations, the dampening algorithm may instead incrementally adjust the wheel speed value used from a theoretical higher speed (that does not result in turning instability/twitching) to the actual wheel speed over a number of steps. The values at each step may then be utilized by the Ackermann equations, effectively dampening steering angle response.

In one embodiment, this dampening process is achieved independently for each wheel 108a, 108b by decrementing from (or alternatively, incrementing to) an arbitrary wheel speed (e.g., a wheel speed in the range of 20-70 RPM (40 RPM)) by a step size, and then using the resulting calculated wheel speed at each step as the wheel speed ($\omega_o$ or $\omega_i$) in the Ackermann equations. This decrementing (or incrementing) process may continue until dampening is determined to no longer be required (e.g., when steady, straight-line travel at slow speeds is achieved, or when a turn is initiated). In one embodiment, the left step size and right step size are calculated proportionally and synchronously such that the number of steps needed to reach the actual wheel speeds for the left and right drive wheel is equal and synchronized.

Figure 11:
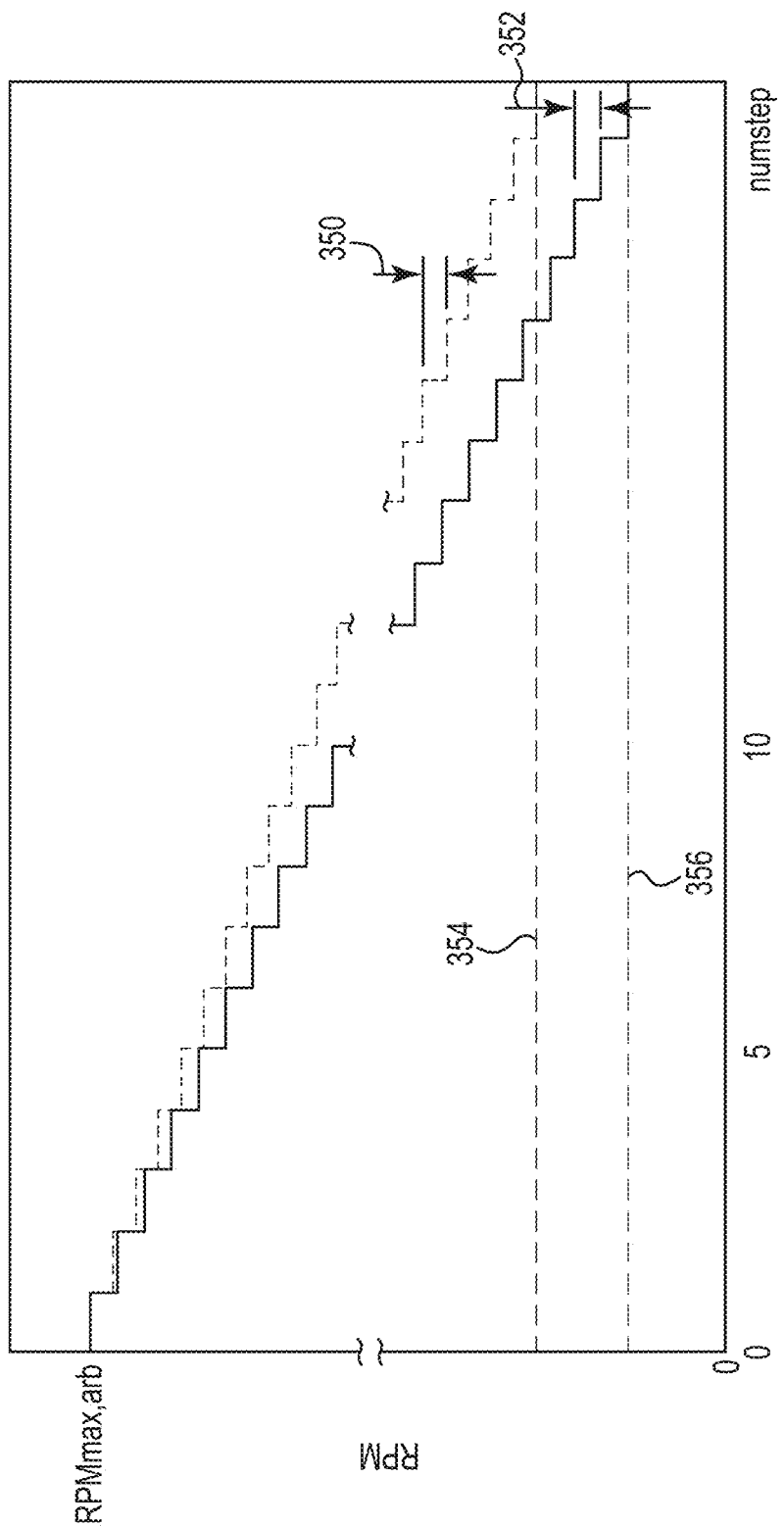
FIG. 11 is a graph plotting RPM (y-axis) vs. step size (x-axis) to illustrate a dampening algorithm in accordance with one embodiment of the disclosure.

FIG. 11 is a graph illustrating an exemplary dampening process that may be applied at 310 in FIG. 7. In this example, it is assumed that the readings Lfsavgt(t) and Rfsavgt(t) (as provided by the filtering sub-process at 500 in FIG. 7 result in SD(t) being less than Dthresh at 308 in FIG. 7. As a result, the dampening algorithm will be applied at 310.

In one embodiment, the step sizes may be calculated as shown in Equations 5 and 6 below (the step sizes Lss(t) and Rss(t) are illustrated in FIG. 11 by reference numerals 352 and 350, respectively).

$$Lss(t) = \text{ABS}\left(\frac{\left[\left(Lfsavg(t) * \frac{150}{100}\right) - RPM\text{max, arb}\right]}{numstep}\right) \quad 5)$$

$$Rss(t) = \text{ABS}\left(\frac{\left[\left(Rfsavg(t) * \frac{150}{100}\right) - RPM\text{max, arb}\right]}{numstep}\right) \quad 6)$$

Wherein:
- Lss(t) and Rss(t)=RPM step size to be utilized in calculating left and right drive wheel speeds, respectively, in Equations 7 and 8 below;
- Lfsavg(t) and Rfsavg(t)=current, processed sensor readings, which are then converted to actual drive wheel speeds (assuming maximum wheel speed is 150 RPM at the 100% forward lever position);
- RPMmax,arb=predetermined, arbitrary drive wheel speed (e.g., 40 RPM) above which dampening is not applied; and
- Numstep=number of steps (e.g., 20 steps) over which RPM will index from RPMmax,arb to the actual drive wheel speed as determined by the current control lever readings.

As an example, if Lfsavg(t) is 4%, the actual left drive wheel speed 356 (see FIG. 11) is 6 RPM) and Lss(t) (see 352 in FIG. 11) is 1.7. Similarly, if Rfsavg(t) is 4.8%, the actual right drive wheel speed 354 is 7.2 RPM and Rss(t) (see 350) would be equal to 1.6 (assuming the variable "numstep" is set to 20).

Once Lss(t) and Rss(t) are determined, these values may be used in Equations 7 and 8 below to calculate the magnitude of RPM output ($\omega_o$ or $\omega_i$) to be provided to the Ackermann equations at 314 in FIG. 8 to set the steering angle commands (further described below) for each step increment.

$$\omega_o(t) = RPM\text{max,arb} - (\text{stepindex} * Lss(t)) \quad 7)$$

$$\omega_i(t) = RPM\text{max,arb} - (\text{stepindex} * Rss(t)) \quad 8)$$

Wherein:
- $\omega_i(t)$ and $\omega_o(t)$=inside (e.g., left for a left turn, right for a right turn) drive wheel speed and outside (e.g., right for a right turn, left for a left turn) drive wheel speed, respectively, inputted into Ackermann equations; and Stepindex=a counter that can be decremented, incremented, or reset to zero based on changes in SD(t) and that has a range from zero to numstep.

Accordingly, the dampening algorithm may, instead of using current values of Lfsavgt(t) and Rfsavg(t) as the basis for inputs to the Ackermann equations, instead incrementally and more gradually approach the commanded steering angle via a plurality of intermediate and discrete steering angles that correspond respectively to a plurality of discrete steering angle commands as described above. For purposes of illustration only, when the time period associated with each step is set to 50 ms, the steer controller may transition to the commanded steering angle (assuming the control levers do not move again) over 20 increments or 1 second. As a result, twitchy response may be substantially attenuated.

If the dampening algorithm is bypassed as a result of the condition at 308 being negative, $\omega_o(t)$ and $\omega_i(t)$ may be calculated at 312 merely by multiplying Lfsavg(t) and Rfsavg(t) by a constant that converts such percentages to a drive wheel speed (in RPM). For example, in one embodiment, the values of $\omega_o(t)$ and $\omega_i(t)$ may be calculated by multiplying both Lfsavg(t) and Rfsavg(t), respectively, by the ratio of 150/100 (the maximum RPM of each drive wheel at 100% forward control lever position). This ratio may be different for reverse control lever positions.

To illustrate the benefits of dampening, Table 3 illustrates exemplary relative positions of the control levers that may be present during typical, low speed (e.g., up to 25% positions), straight-ahead travel. As illustrated in this table, L(t) (i.e., Lfsavg(t)) is presented in 1% steps of control lever movement up to 25%, while R(t) (i.e., Rfsavg(t)) is shown with a typical lever offset that might be present as the operator seeks to maintain straight-ahead transport.

TABLE III

| Lfsavg(t), % Forward | Rfsavg(t), % Forward |
|---|---|
| 0 | 0 |
| 1 | 0.5 |
| 2 | 2.7 |
| 3 | 3.5 |
| 4 | 4.6 |
| 5 | 5.4 |
| 6 | 5.9 |
| 7 | 6.9 |
| 8 | 8.5 |
| 9 | 9.6 |
| 10 | 10.1 |
| 11 | 10.9 |
| 12 | 11.5 |
| 13 | 12.6 |
| 14 | 15.2 |
| 15 | 16.5 |
| 16 | 17 |
| 17 | 18 |
| 18 | 17 |
| 19 | 20 |
| 20 | 22 |
| 21 | 21 |
| 22 | 23 |
| 23 | 24 |
| 24 | 25 |
| 25 | 25 |

Figure 12A:
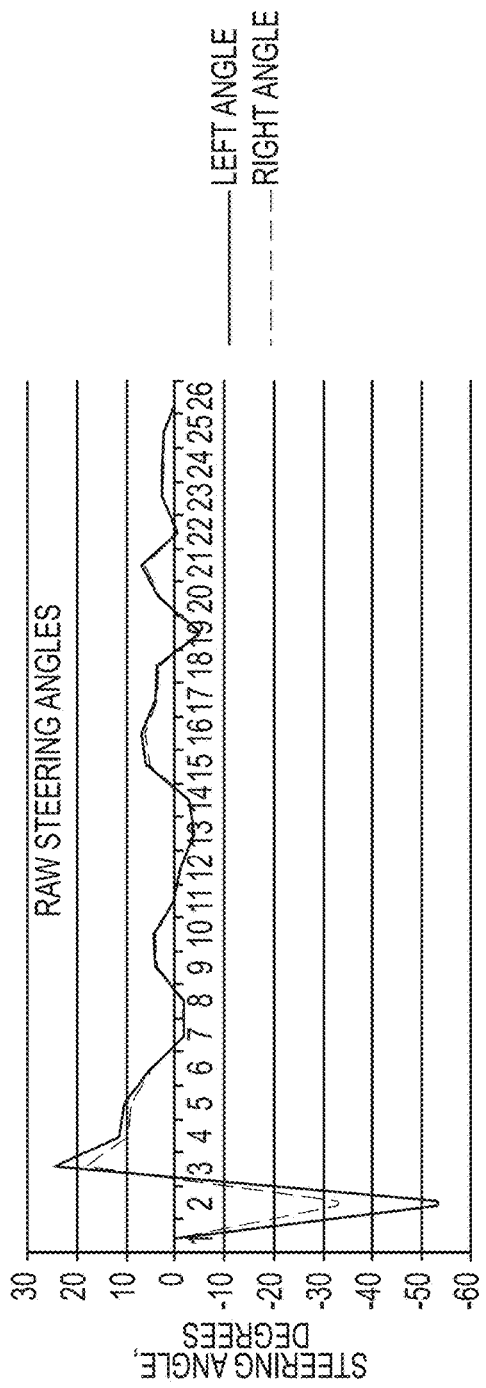

FIG. 12A is a graph of the simulated data presented in Table III (plotted as steering angle command v. time (e.g., illustrated in steps of 50 ms) showing the large variation in steering angle command when lever position readings (e.g., Lfsavg(t), Rfsavg(t)) are not dampened. As shown in these views, for Lsavg(t) equal to 1% and Rfsavg(t) equal to 0.5%, the Ackermann calculated steering angles may produce a steering angle of −31 degrees for the right wheel and −52 degrees for the left wheel. As one can appreciate, such steering angles are disruptive when the operator intends straight-ahead travel.

Figure 12B:
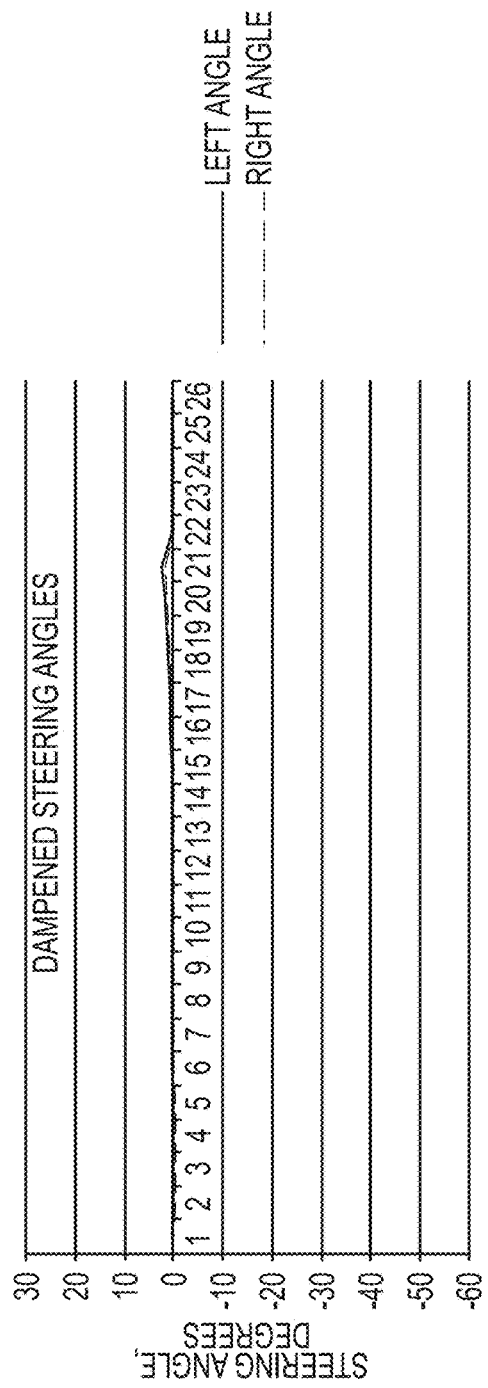

FIG. 12B, on the other hand, is a graph illustrating the same simulated control lever inputs of Table III as now processed by the dampening algorithm in accordance with embodiments of this disclosure. As shown in this view, the steering angles of both the left and right wheels remain, with only slight variation, generally at or near zero. As a result, the operator may maintain the desired straight-line direction without the aggressive steering response evident in FIG. 12A.

Once the pre-processing steps (e.g., 306, 400, 500, 308, 310, and 312) are complete, the values of $A_i(t)$ and $A_o(t)$ (see Ackermann equations 1 and 2 above) may be calculated at 314. In some embodiments, before or after these steering angle commands are passed to the motor controllers 222, additional post-processing may be provided at 316 to account for a variety of detected vehicle dynamic characteristics (e.g., as may be detected by additional vehicle sensors, of which examples are listed elsewhere herein). While not wishing to be bound to any specific characteristics, it is contemplated that one or more characteristics including: a shift in weight distribution between the wheels; wheel slip (which, as used herein, includes both: the difference between wheel rotational speed and its free-rolling speed (e.g., wheel "spinning out" or skidding); as well as the difference between a steered wheel's actual direction of travel and the vehicle's heading); wheel speed; wheel acceleration; and actual turn center relative to calculated or intended turn center may be analyzed to determine if steering modification (over the steering angles provided by the Ackermann equations) may be beneficial. Based upon an analysis of these characteristics, the control system 210 may determine whether steering angles in excess of, or less than, the angles provided by the Ackermann calculations may be beneficial. For instance, for forward Lfsavg(t) and/or Rsavg (t) greater than some threshold (e.g., 50%), the steer controller 220 may apply an oversteer compensation calculation as indicated at 316. That is to say, the steer controller may artificially alter (increase or decrease) the steering angle commands $A_i(t)$ and $A_o(t)$ calculated by the Ackermann equations to provide expected steering response when the control system 210 anticipates dynamic vehicle characteristics may benefit from oversteer (or understeer).

In other embodiments, the control system 210 (e.g., steer controller 220) may dynamically adjust a toe-in angle of the front wheels to improve or maintain straight-line tracking (movement in a straight and forward direction) of the mower. While toe-in is conventionally set permanently, one advantage of an active steering system like embodiments of the present disclosure is that toe-in angle may be dynamically adjusted to address current situations and/or operator preferences.

The exemplary process of FIG. 7 may then progress to 318, wherein the control system, e.g., the motor controllers 222, may determine which direction to rotate the respective front wheels in order to achieve the commanded steering angle with the least amount of wheel rotation (e.g., about the spindle axis 126 of FIG. 2). As stated above, the steering motors may be capable of continuous rotation. Moreover, the wheels 108 may rotate bi-directionally (e.g., if the steering angle is commanded to rotate from 0 degrees to 170 degrees, the motor controllers may determine that the wheel assembly need only rotate 10 degrees in order to provide the new steering angle). Accordingly, the motor controllers may determine the smallest angular movement that will provide the desired steering angle at 318.

At this point, the motor controllers 222 may command (see steer commands 212 in FIG. 5) their respective wheels to steering angles corresponding to the steering angle commands received by the steer controller 220 as shown at 320 in FIG. 8. The process may then return to 304 when the controller time period expires (e.g., after 50 ms) and repeat, or end at 324 if the determination at 322 is negative.

By executing a process like that exemplified in FIG. 7, the control system 210 may provide intuitive front wheel steer output even when control lever positions may be indeterminate (e.g., for neutral lever crossings) or otherwise dictate steering angles that are unintended (see, e.g., FIG. 12A). Vehicles that provide stable and intuitive active steering in what are otherwise passive, castering wheels may thus be provided.

While not illustrated, the algorithm 300 could be modified to permit the front wheel assemblies to caster like a conventional zero-turn-radius mower. However, once the mower encounters a condition that causes the passive caster wheels to exceed predefined criteria (e.g., steering angle), the algorithm may command the steering motors to turn to specific steering angles. For example, when one or both of the front wheel assemblies achieve a predetermined steering angle threshold (which may occur when, e.g., the mower is operating on a hill, or when one of the drive wheel speeds indicate slipping), the control system 210 may command each front wheel assembly to a particular steering angle. While this may occur without user intervention, other embodiments may provide an operator selector switch that could change the vehicle from having passively steered to actively steered front wheels.

Further, it is to be understood that other variations are certainly possible within the scope of this disclosure. For example, while various functions are described with respect to the steer controller and the motor controllers, these embodiments are exemplary only as either controller may be configured to perform various functions (e.g., the motor controllers could perform state machine analysis, filtering, dampening, etc.). Moreover, while various steering processes are described above with specificity, such embodiments are not limiting. For instance, dampening could alternatively be achieved by, for example throttling of actuator speed and/or filtering of: system input signals; intermediate calculated values; or output signals.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A grounds maintenance vehicle comprising:
a frame comprising a front end and a rear end;
a prime mover attached to the frame;
first and second drive members connected to opposite sides of the frame at or near the rear end, the drive members adapted to propel the vehicle over a ground surface;
a drive system operatively connecting each drive member to the prime mover, the drive system adapted to independently transmit power from the prime mover to each of the first and second drive members;

an input device operatively connected to the drive system and adapted to control both a speed and a direction of the first and second drive members;

a position sensor adapted to sense a position of the input device and output a position signal based thereon;

a steerable wheel connected to the frame at or near the front end, the steerable wheel supporting a portion of the vehicle upon the ground surface;

a controller adapted to receive the position signal and both: identify a change in steering state based upon a comparison of the position signal with a previous position signal; and generate a steering angle command based upon both the position signal and the steering state; and an actuator in communication with the controller and connected to the steerable wheel, the actuator adapted to reposition the steerable wheel to a steering angle corresponding to the steering angle command.

2. The vehicle of claim 1, further comprising a second steerable wheel.

3. The vehicle of claim 2, further comprising a second actuator connected to the second steerable wheel.

4. The vehicle of claim 1, wherein the actuator comprises an electric motor.

5. The vehicle of claim 1, wherein the input device comprises a drive control lever in communication with the position sensor such that the position signal is indicative of a position of the drive control lever, and wherein the steering angle command is calculated based upon a running average of the position signal.

6. The vehicle of claim 5, wherein the running average of the position signal is calculated based upon a variable sample size.

7. The vehicle of claim 1, wherein the controller is adapted to distinguish between a plurality of steering conditions, each condition being defined by whether the input device corresponds to neutral, forward, or reverse propulsion of each of the first and second drive members.

8. The vehicle of claim 1, wherein the controller is adapted to alter the steering angle command based upon one or more of: a shift in weight distribution; wheel slip; wheel speed; wheel acceleration; and actual turn center relative to intended turn center.

9. The vehicle of claim 1, wherein the controller is adapted to alter the steering angle command to maintain straight-line tracking of the vehicle.

10. The vehicle of claim 1, wherein the steerable wheel forms part of a wheel assembly that is connected to the frame for rotation about a spindle axis, and wherein the actuator is adapted to infinitely rotate the wheel assembly about the spindle axis.

11. The vehicle of claim 1, wherein the steerable wheel forms part of a wheel assembly that is connected to the frame for rotation about a spindle axis, and wherein the wheel assembly is adapted to transition the steerable wheel to any steering angle by rotating 90 degrees or less about the spindle axis.

12. The vehicle of claim 1, wherein the steerable wheel forms part of a wheel assembly that is connected to the frame for rotation about a spindle axis, wherein the vehicle further comprises a steering angle sensor associated with either the wheel assembly or the actuator, the steering angle sensor adapted to measure the steering angle of the wheel assembly about the spindle axis.

13. The vehicle of claim 1, wherein the controller is adapted to dampen movement of the steerable wheel to the steering angle.

14. A riding lawn mower vehicle, comprising:

a frame;

a prime mover attached to the frame;

first and second drive wheels attached to opposite sides of a rear portion of the frame, the drive wheels adapted to propel the vehicle over a ground surface;

first and second drive wheel sensors associated with the first and second drive wheels, respectively, wherein the first and second drive wheel sensors are adapted to detect a speed and direction of their respective drive wheels and generate respective first and second wheel speed signals proportional thereto;

first and second transmissions configured to power the first and second drive wheels, respectively;

a first control lever mechanically coupled to the first transmission such that movement of the first control lever through a range of motion causes the first transmission to alter one or both of the speed and the direction of the first drive wheel;

a second control lever mechanically coupled to the second transmission such that movement of the second control lever through a range of motion causes the second transmission to alter one or both of the speed and the direction of the second drive wheel;

first and second lever position sensors associated with the first and second control levers, respectively, each of the lever position sensors adapted to detect a position of its associated control lever, within its range of motion, and generate a lever position signal representative thereof;

first and second steerable wheels supporting a front portion of the vehicle upon the ground surface;

a cutting deck connected to the frame;

a controller adapted to identify a change in steering state based upon a comparison of, for each control lever, the lever position signal with a corresponding previous lever position signal, and generate first and second steering angle commands based upon both of: the lever position signals of the first and second control levers; and the steering state; and first and second actuators connected to the first and second steerable wheels, respectively, the first and second actuators adapted to receive the first and second steering angle commands, respectively, from the controller and set a corresponding steering angle for each of the first and second steerable wheels.

15. The vehicle of claim 14, wherein the first and second actuators each comprise an electric motor.

16. The vehicle of claim 14, further comprising a steering angle sensor associated with either the first steerable wheel or the first actuator, the steering angle sensor adapted to measure the steering angle of the first steerable wheel.

17. The vehicle of claim 14, wherein the controller is adapted to dampen movement of the first and second steerable wheels about respective spindles axes as the first and second steerable wheels transition to their respective steering angles.

18. The vehicle of claim 14, wherein the controller is adapted to modify one or both of the first and second steering angle commands when the controller detects that one or both of the drive wheels are slipping relative to the ground surface.

19. The vehicle of claim 14, wherein the controller is adapted to modify one or both of the first and second steering angle commands when the controller detects a shift in weight distribution of the vehicle.

20. The vehicle of claim 14, wherein the controller is adapted to identify the change in steering state when either of the lever position signals changes from: a negative value to either zero or a positive value; a positive value to either zero or a negative value; or zero to either a positive value or a negative value.

\* \* \* \* \*